ized Patent

[11] 3,581,072

[72] Inventor Frederick Nymeyer
  366 E. 166th St., Holland, Ill. 60473
[21] Appl. No. 723,644
[22] Filed Mar. 28, 1968
[45] Patented May 25, 1971
  Continuation-in-part of application Ser. No. 317,026, Oct. 17, 1963, now abandoned.

[54] AUCTION MARKET COMPUTATION SYSTEM
  23 Claims, 12 Drawing Figs.
[52] U.S. Cl. .................................................. 235/152, 340/149
[51] Int. Cl. .................................................. G06f 7/38
[50] Field of Search .......................................... 235/152; 340/172.5, 146.2, 149, 152, 154

[56] References Cited
  UNITED STATES PATENTS
  3,015,089 12/1961 Armstrong ............... 340/172.5
  3,159,818 12/1964 Scantlin .................. 340/172.5
  3,229,257 1/1966 Lubkin et al. ............ 340/172.5
  OTHER REFERENCES
  New York Stock Exchange Guide; Rule 115; Section 2115A 20; page 2731

The Specialist; published by the New York Stock Exchange
Von Boehm-Bawerk, Evgen: "Valve and Price" (An Extract), pp. 215— 235 (An extract from the three volume work "Capital and Interest"), Lidertarian Press, South Holland, Illinois, 1960

Primary Examiner—Malcolm A. Morrison
Assistant Examiner—David H. Malzahn
Attorney—Mason, Kolehmainen, Rathburn and Wyss ABSTRACT: A special purpose digital computer matches orders and establishes market prices in an auction market for fungible goods. Priced orders to buy are arranged in descending order by price and priced orders to sell are arranged in ascending order by price within each price range, all orders are arranged in descending order by time of placement so that the older orders are uppermost. All compatibly priced orders are then matched starting with the highest priced order to buy and the lowest priced order to sell and proceeding sequentially until all compatibly priced pairs of orders have been matched. The prices accompanying the last pair of orders to be matched are then used to establish a trading price for all of the matched pairs and a new market price for future transactions. Unpriced or "at market" orders are assigned prices based upon the market price, unless the market price is substantially below the prices of all priced buy orders or substantially above the price of all priced sell orders, in which case the unpriced orders are not assigned prices until a new market price has been established.

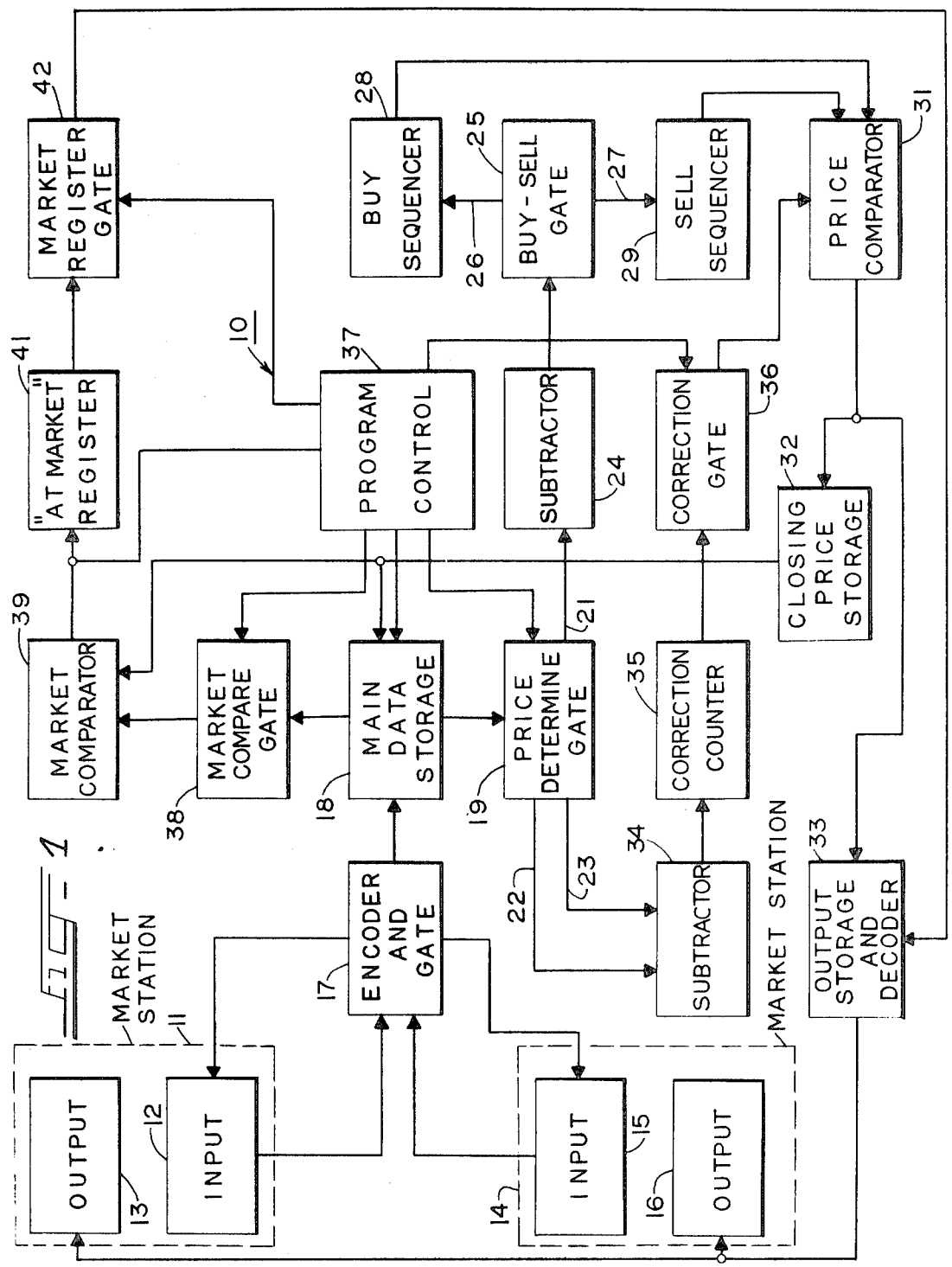

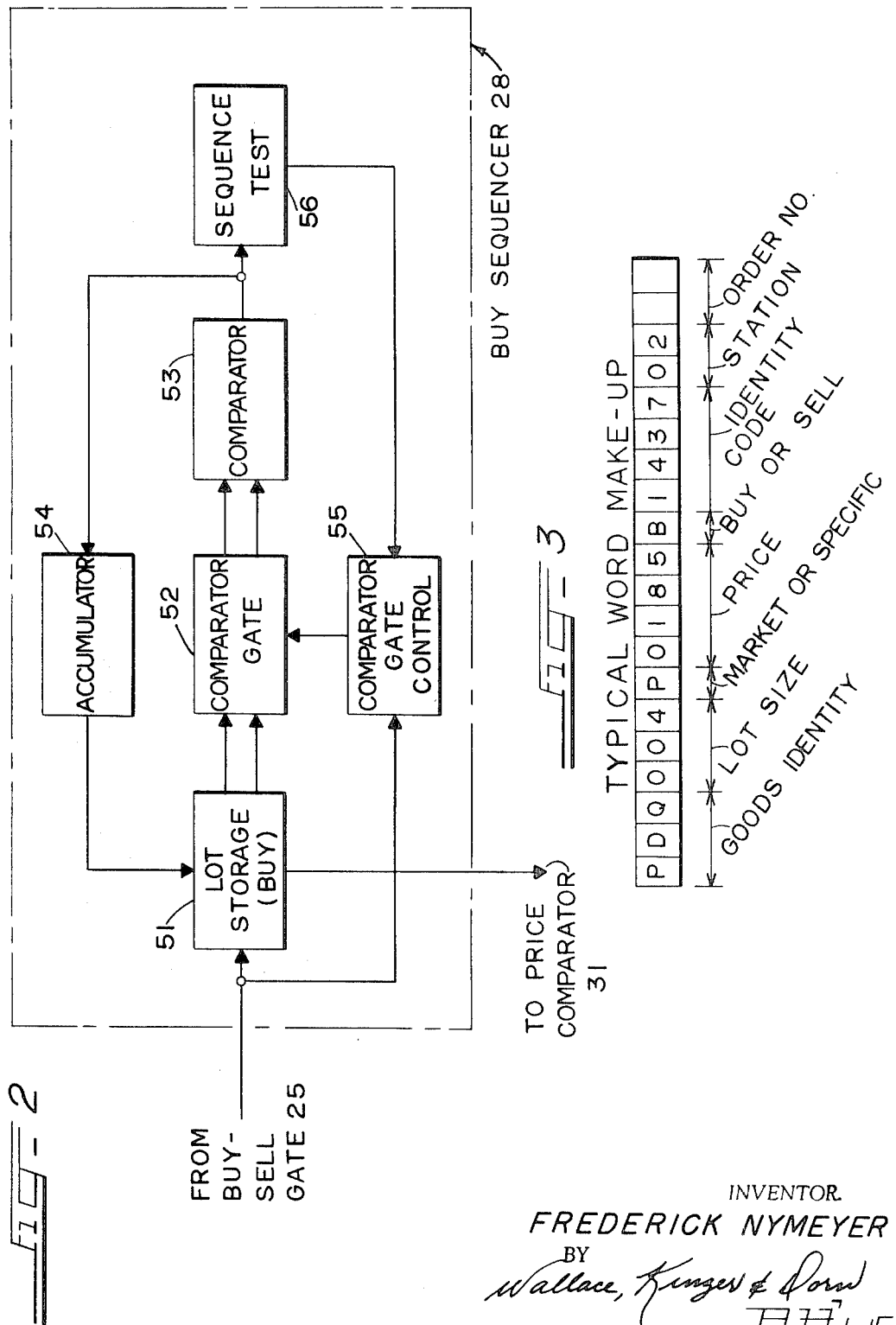

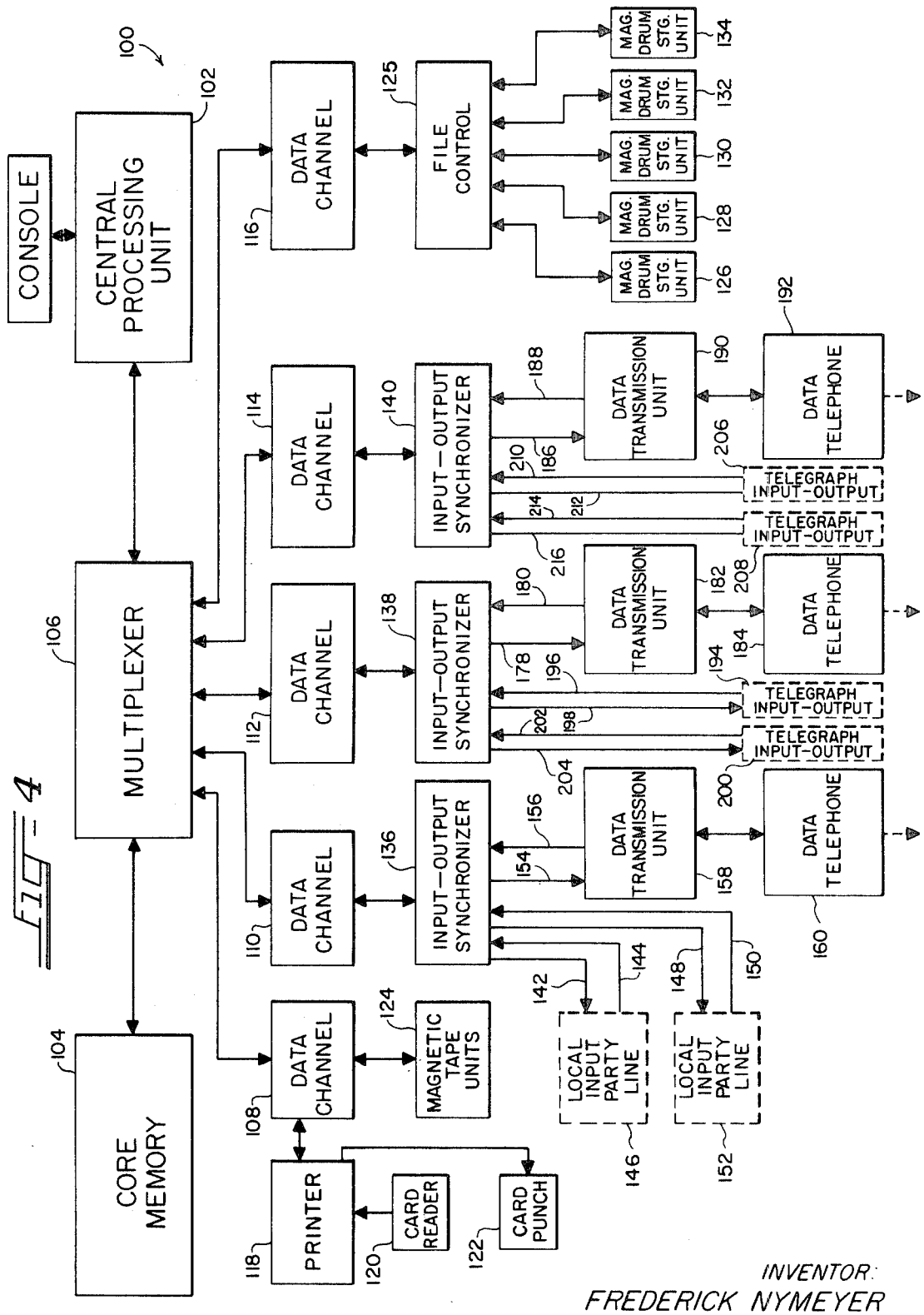

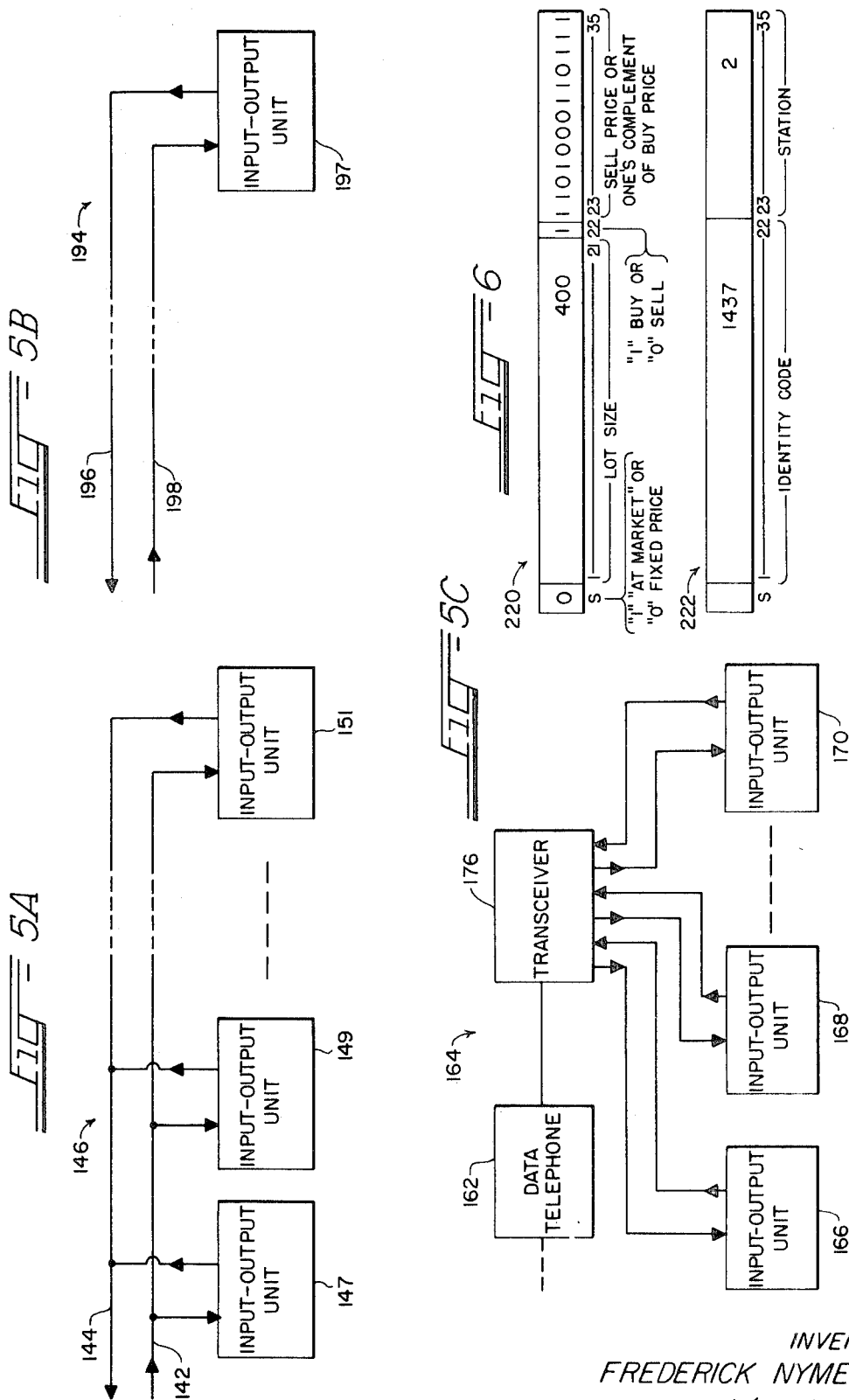

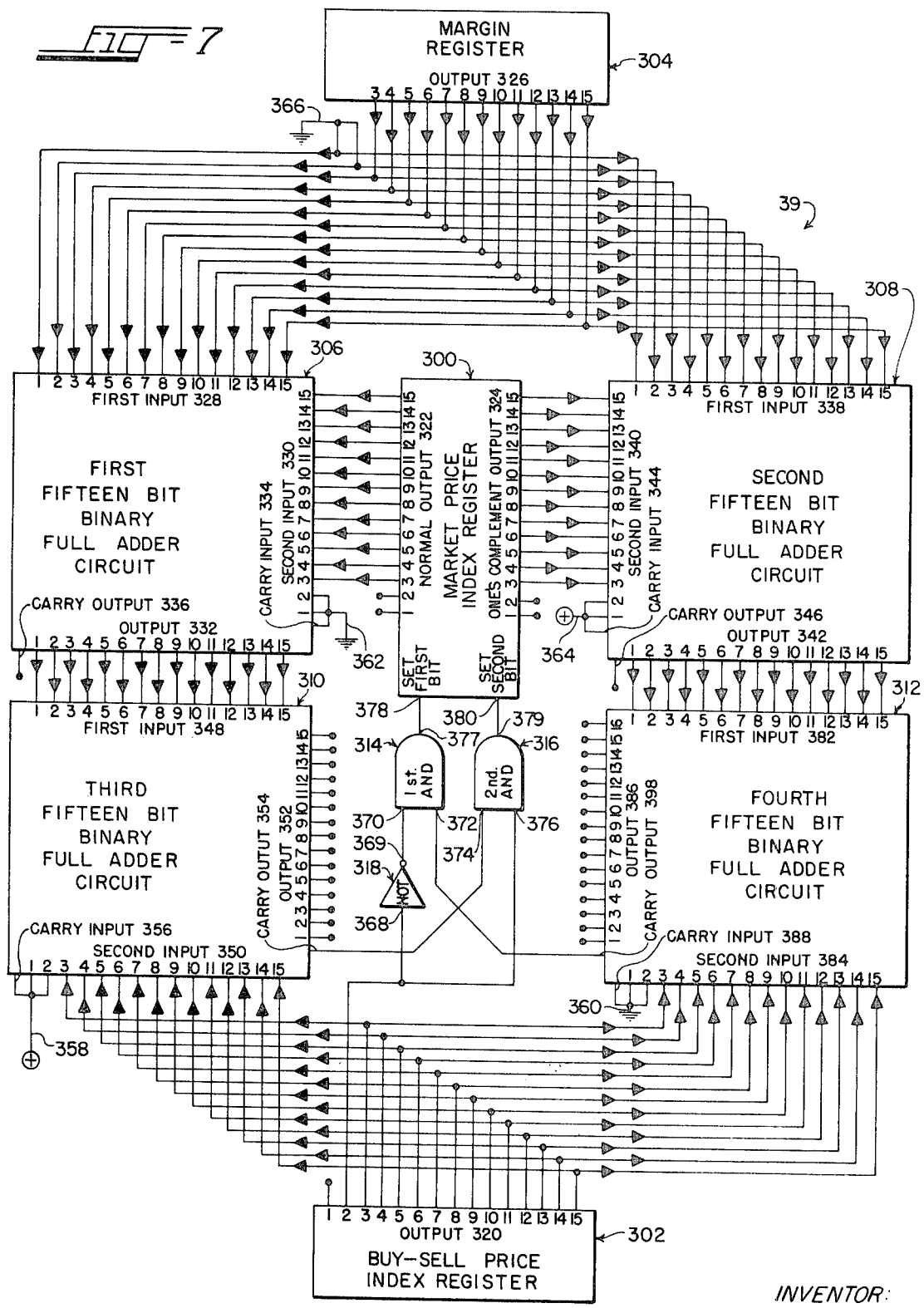

FIG. 8A

| LOCATION | CONTENTS | | |
|---|---|---|---|
| 0 | | | |
| 1 | | | |
| 1001 | A A | T | |
| 1002 | A P | L | |
| 1003 | A T | T | |
| 1075 | P D | Q | |
| 1099 | Y I | | |
| 1100 | Z G | B | |
| 1101 | 1 1 | 12 7/8 | |
| 1102 | 0 1 | 125 1/2 | |
| 1103 | 1 1 | 3210/8 | |
| 1175 | 0 1 | 186 1/8 | |
| 1199 | 1 0 | 42 1/2 | |
| 1200 | 1 1 | 35 1/8 | |
| 1201 | + | 200 | |
| 1202 | − | 1100 | |
| 1203 | + | 0 | |
| 1275 | + | 1100 | |
| 1299 | + | 300 | |
| 1300 | − | 1500 | |
| 1301 | | | |
| 32,767 | | | |

Locations 1001–1100: STOCK INDEX STORAGE BLOCK (250)

Locations 1101–1200: CLOSING PRICE STORAGE BLOCK (252)

Locations 1201–1300: CORRECTION COUNTER STORAGE BLOCK (254)

INVENTOR:
FREDERICK NYMEYER
By Mason, Kolehmainen, Rathburn & Wyss
Attys.

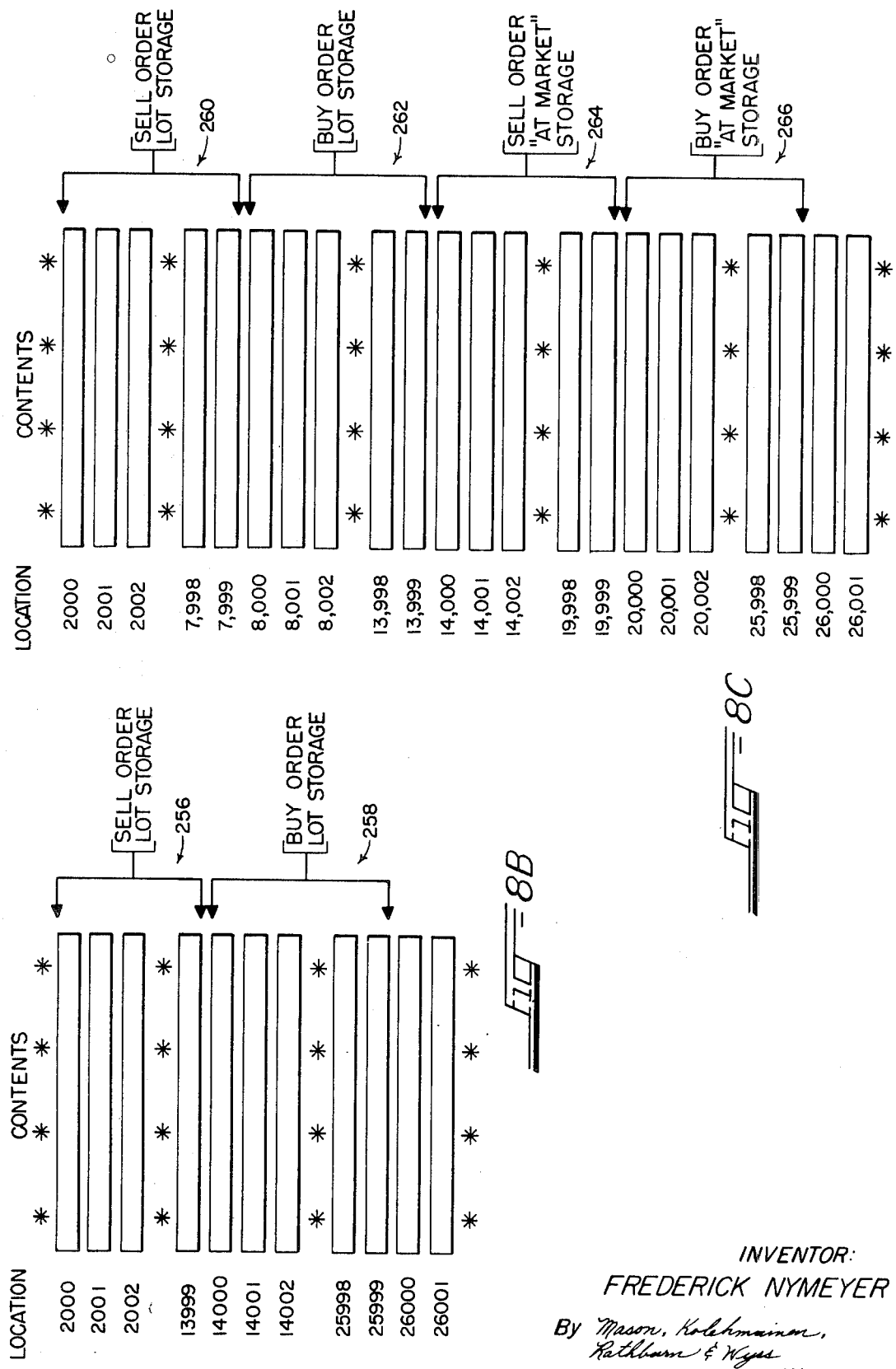

AUCTION MARKET COMPUTATION SYSTEM

This application is a continuation-in-part of the copending U.S. Pat. application Ser. No. 317,026, filed Oct. 17, 1963, and now abandoned.

This invention relates to a new and improved price computation system for commodity exchanges, stock exchanges, and similar auction markets; more particularly, the invention pertains to a novel system for establishing exchange prices for any form of fungible goods, in an auction market, without requiring the exercise of human judgment as a substantial factor in the price determination.

In a stock exchange or similar auction market, it is necessary to match purchase orders with offers to sell in order to arrive at a price at which a sale can be completed. In the New York Stock Exchange, for example, the ultimate determination of price for any given transaction frequently is effected by a specialist, who deals in a particular stock and who maintains a running list or "book" of offers to sell and orders to purchase that stock. The specialist may complete a transaction in the stock whenever one or more purchase and sell orders can be matched with respect to price; on occasion, the same specialist purchases the particular stock in which he specializes or sells the same stock in order to maintain a market for the stock and prevent violent fluctuations in its price. Similar functions, particularly with respect to the matching of orders to purchase and to sell, must be carried out in all auction markets for the marketing of fungible goods, including such commodities as wheat, corn, and the like as well as stocks and bonds.

The maintenance of a fair and orderly market becomes increasingly difficult in direct relation to the increasing complexity of the business structure upon which the markets are based. In recent times, with an increasing number of corporate securities publicly available, and an increasing number of individuals participating in all markets as investors or speculators, the ability of individual specialists or similar functionaries to keep up with the market demands has been laid open to substantial doubt. At the same time, the increase in the number of individuals participating in the markets but not directly present increases the possibility of manipulation of market prices by those persons, such as the stock specialists actually present at the exchange and actively engaged in making market price determinations.

The maintenance of complete records of market transactions has become increasingly desirable from the standpoint of adequate tax records and protection of public participants in the market. On the other hand, and particularly because the market for given fungible goods may change rapidly in the light of business developments, no adequate substitute for human judgment in the determination of market prices has heretofore been presented.

It is a primary object of the present invention, therefore, to automate the price determinations in an auction market for fungible goods and, concomitantly, to eliminate or at least minimize the human judgment factors that have heretofore entered into such price determinations.

A related object of the invention is to provide an automatic computation system for establishing exchange prices for fungible goods, in an auction market, that adequately corrects for the presence of orders either to purchase or to sell at the "market price." In particular, it is an object of the invention to correct for the presence of "at market" orders in those instances in which a substantial change has occurred in business conditions, leading to an obvious necessity for a substantial change in price from the previous closing price.

Another object of the invention is to afford an automatic computation system for establishing exchange prices for fungible goods, in an auction market, that maintains a complete running record of all buy and sell orders and completed transactions.

Another object of the invention is to eliminate or reduce the necessity for exercise of human judgment with respect to making a market or maintaining an orderly market in the face of apparent large fluctuations in prices with respect to given fungible goods in an auction market.

A specific object of the invention is to provide a new and improved automatic computation system that is effective to maintain a true auction market for fungible goods.

Accordingly, the present invention relates to a computation system for establishing prices for a given kind of fungible goods in an auction market; this computation system comprises a main data store for recording encoded data items representative of orders to buy and to sell the goods, such orders including orders at specific prices and other orders "at the market." The system includes a buy order sequencing device for arranging and recording purchase offers first in descending order by price and secondly by time of entry so that at each price level the oldest orders are uppermost. A sell order sequencing device is provided for arranging and recording all offers to sell first in ascending order by price and secondly in descending order by time so that once again the oldest orders are the highest at each price level. A closing price store is provided to record the last actual selling price for the goods. The closing price store and the main data store are coupled, by suitable control means, to the sequencing devices in order to transfer the recorded data items from the data store to the sequencing devices with "at market" prices being transferred at the aforementioned last selling price. The two sequencing devices are coupled to a comparator that compares the sell orders and the buy orders, when they have been arranged in sequence, to determine the lowest buy order price that is equal to or greater than a recorded sell order and thus establish a new selling price for the goods.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

In the drawings:

FIG. 1 is a block diagram of an auction market computation system constructed in accordance with one embodiment of the present invention;

FIG. 2 is a more detailed diagram illustrating a sequencing circuit arrangement comprising an integral part of the system of FIG. 1;

FIG. 3 illustrates a typical word makeup for a coded data item as employed in the system of FIG. 1;

FIG. 4 is a block diagram of a stock exchange computational system constructed in accordance with one embodiment of the present invention;

FIG. 5A is a more detailed diagram illustrating a typical local input party line;

FIG. 5B is a more detailed diagram illustrating a typical telegraph input-output.

FIG. 5C is a block diagram of a remote office containing several input-output units;

FIG. 6 illustrates a typical pair of 36-bit order words as employed in the system of FIG. 4;

FIG. 7 is a block diagram of a market comparator arrangement comprising an integral part of the system of FIG. 4;

FIG. 8A is a diagram illustrating the location and contents of certain storage blocks within the core memory of the system of FIG. 4;

FIG. 8B is a diagram illustrating lot storage locations within the core memory of the system of FIG. 4, when priced and "at market" orders are both placed into lot storage locations; and FIG. 8C is a diagram illustrating the lot storage locations and "at market" register locations within the core memory of the system of FIG. 4 when priced and "at market" orders are placed in separate locations.

The auction market computation system 10 illustrated in FIG. 1 includes a first market station 11 comprising an input device 12 and an output device 13. Typically, the input device 12 may comprise a typewriter unit of the kind that automatically prepares a punched tape or other encoded record of data typed by the machine. Input apparatus of this kind is well known in the art; the particular form selected for the encoded output of the machine is not critical with respect to the present invention and may, for example, constitute a five-level or six-level punched tape or a magnetically recorded tape. The punched tape is preferred because it provides a permanent record of transactions as discussed more fully hereinafter. Usually, a typewriter of this kind may be actuated either manually or by an external input, either a direct electrical signal input or a punched tape input. If equipment of this kind is selected for the market station 11, then the output device 13 may be physically integrated with the input device 12.

A given computation system constructed in accordance with the invention may include a single market station, such as the station 11, through which all transactions are processed. On the other hand, it is frequently desirable to permit the recording and completion of transactions from more than one location. Hence, the system 10 may include one or more additional market stations as indicated by the market station 14 in FIG. 1. Market station 14 is essentially similar to market station 11 and includes an input apparatus 15 and an output device 16. Again, the input and output devices may comprise a single typewriter of the kind that produces a punched tape output and that may be actuated by a punched tape input.

The input device 12 of market station 11 is connected to an encoder 17. Where two market stations are included in the system, as illustrated, the input device 15 of the second market station is also connected to the encoder 17 and the encoder is provided with suitable gating apparatus for selecting the outputs of either of devices 12 or 15 for translation into the main computation portion of the system. Suitable return connections may be provided from the encoder and gate unit 17 to actuate signal devices or to lock out the individual input devices 12 and 15 and thus limit the operation of those devices to prevent simultaneous actuation thereof.

The encoder unit 17 is employed to encode incoming data in a form suitable for use in the main computation circuits of the system 10. The input data may be in the form of code representations of alphabetic and numeric characters with the numeric data in decimal form. Usually, it is preferable to translate the data into a binary or modified binary code to facilitate computations in the main portion of the system. On the other hand, it is possible to operate a system based upon decimal data and alphabetic characters, using a suitable machine code, and the system may be constructed for this kind of code if desired.

The output of encoder and gate circuit 17 is connected to a main data storage unit 18. The main data storage unit 18 may constitute a magnetic core storage unit of conventional form. In most instance, however, and particularly where the system 10 is to afford computations with respect to more than one stock, commodity, or other form of fungible goods, it is desirable to utilize a main data store of greater capacity than is practical with a magnetic core unit. Thus, the main data store 18 is preferably a magnetic drum or magnetic disc storage unit or other similar storage device of relatively large capacity.

The main data storage unit 18 is provided with an output circuit that is connected to a price determining gate circuit 19 having three outputs 21, 22 and 23. The output circuit 21 of gate 19 is connected to a subtractor circuit 24. The subtractor circuit 24, in turn, is coupled to a buy-sell gate circuit 25 having two outputs 26 and 27. The first output 26 of the buy-sell gate 25 is connected to a buy order sequencing device 28 that is utilized to arrange and record buy orders in descending order by price. The sequencing circuit 28 should also provide for arrangement of the buy orders in descending order by time, as discussed more fully hereinafter. The other output 27 of the buy-sell gate is connected to a similar device, a sell order sequencing device 29. Device 29 arranges and records sell orders in ascending order by price but in descending order by time.

The sequencing devices 28 and 29 are each provided with an output circuit and these two output circuits are both connected to a price comparator 31. Typically, the price comparator 31 may be constructed in the form of two shift registers with appropriate gating logic circuits and including a full subtractor circuit. It is the comparator circuit 31 that ultimately determines a new selling price for the fungible goods in the market controlled by computation system 10. The output of the price comparator is connected to a closing price store 32 and to an output storage and decoder device 33. The decoder 33 translates the data from price comparator 31 back from the binary or other code employed in system 10 to the code required to actuate the output devices 13 and 16 at the market stations 11 and 14, respectively, and stores that data for later use.

Returning to the price determination gate 19, the two output circuits 22 and 23 are utilized to translate "at the market" buy orders and "at the market" sell orders, respectively, to a subtractor circuit 34. The output of the subtractor circuit is applied to a correction counter 35 that may constitute a conventional transistorized counter circuit. The correction counter 35, in turn, is coupled to a correction gate 36 having an output coupled to the price comparator unit 31. The correction gate 36 is controlled by a main program control unit 37 that is also coupled to and employed to actuate both the main data storage unit 18 and the price determination gate 19.

The main data store 18 is also provided with a further output that is coupled to a market comparison gate 38. The market comparison gate 38, like the other gate circuits in the system, is actuated from the main program control unit 37. The output from the market comparison gate 38 is coupled to a market comparator circuit 39; this circuit, like the price comparator 31, may constitute a pair of shift registers with appropriate gating logic and a full subtractor circuit. The market comparator is provided with an additional input from the closing price store 32. The output of the market comparator is coupled to the main program control unit 37; the market comparator is also coupled to an "at market" register 41 that is connected through a gate circuit 42 to the output storage and decoder unit 33. The "at market" register 41 may comprise a magnetic drum storage unit and may be mechanically integrated with the main data store 18, utilizing one or more storage tracks or discs of the main storage unit. On the other hand, the "at market" register may constitute a separate magnetic disc or core memory unit or a transistor counter device, depending in part upon the amount of data that may be stored in the register at any given time.

FIG. 3 illustrates the makeup of a typical "word" or data item as applied to the auction market computation system 10. That is, FIG. 3 shows the makeup of the data item as it is typed or otherwise entered into the system at one of the input devices 12 and 15.

In a typical data item or word to be applied to the system, it is necessary to identify and to indicate the quantity of the particular stock, commodity, or other fungible goods to be entered in the system. The first three divisions or characters of the word identify the goods, whereas the next three characters give the lot size. Alphabetic or numeric characters, or both, can be used for identification of the goods.

It is also necessary to enable the system to distinguish between orders placed at a specific price, whether buy orders or sell orders, and those orders that are entered "at the market." The seventh character of the typical word illustrated in FIG. 3 conveys this information. In the illustrated data word, a specific price order is shown.

The next essential information required for each data item to be entered in the computation system pertains to the price at which the goods are offered or at which the goods are to be purchased. In the illustration of FIG. 3, the four data characters following the character indicating market or specific price give the express price for the particular order represented by the word. The next character in the word identifies the nature of the order; that is, this character distinguishes the offers to purchase from offers to sell. The next four characters constitute an identification code indicating the broker or other customer who has entered the order. Two characters are shown as employed to identify the station from which the order has originated. Two additional characters are shown in the word as being employed to identify the order by time, an order number being assigned for this purpose.

FIG. 2 illustrates the principal components of the buy sequencer circuit 28 of FIG. 1. The buy sequencer circuit comprises a lot storage unit 51 that receives code data input signals from the buy-sell gate 25. The lot storage unit may comprise an independent magnetic drum or disc storage unit or may be physically integrated with the main data store 18. The lot storage unit is provided with suitable output circuits connected through a comparator gate 52 to a comparator circuit 53. This comparator, like the others in the system 10, may be conveniently constructed in the form of two shift registers with appropriate gating logic and a full subtractor circuit.

The output of the comparator 53 is coupled to an accumulator 54 that is connected back to the lot storage unit 51 to re-record data in the lot storage device as described more fully hereinafter. The accumulator 54 is simply a one-word storage unit or shift register and may be constructed in the form of a magnetic core circuit or a conventional chain of transistor flip-flop circuits. Alternatively, an acoustical delay line or similar delay device may be utilized as the accumulator.

The comparator gate 52 is controlled by a gate control circuit 55. One input to the gate control 55 is connected to the input circuit to the buy sequencer 28, the circuit coming from the buy-sell gate 25. The gate control circuit 55 is provided with a second input from a sequence test circuit 56 that is connected to the output of comparator 53.

PRICE COMPUTATION I

In considering the operation of the computation system 10, a hypothetical example of a given market situation may be assumed. For a given stock PDQ, it may be assumed that the last closing price in the market was $18 per share. Following the transaction at $18 per share, new orders to buy and sell this stock are received, these orders, in the sequence in which they are received, being as follows:

TABLE I

| Purchase orders | | Sale orders | |
|---|---|---|---|
| Shares | Price | Shares | Price |
| 200 | $20.00 | 100 | $17.00 |
| 300 | 18.50 | 400 | 18.00 |
| 100 | 19.50 | 300 | 18.50 |
| 200 | 17.00 | 800 | 17.50 |
| 1,000 | 16.50 | 600 | 18.50 |
| 300 | 19.00 | 100 | 18.00 |
| 200 | 18.00 | 100 | 18.50 |
| 200 | 17.00 | 400 | 18.00 |
| 100 | 17.50 | 2,800 | At specific prices. |
| 200 | 19.00 | | |
| 300 | 18.50 | 800 | "At market." |
| 3,100 | At specific prices | | |
| 1,400 | "At market" | | |
| 4,500 | Total | 3,600 | Total. |

In addition to new orders, there may be carryover or "open" orders, which would be included in the listing.

The individual "at market" orders have not been shown in time sequence, in order to reduce the length of the tabulated information.

As each order is received, it is entered into the main data storage unit 18. A typical order, as shown in FIG. 3, is typed into one of the input devices 12 or 15 in accordance with the required word makeup to present the complete data pertaining to the order to the computation system. Succeeding orders are entered in the same manner and, at the outset, are stored in the main data storage unit 18, with no computation taking place.

In this first example of operation of the computation system 10, it will be noted that there are specific orders to purchase at and above, and to sell at and below, the $18 price constituting the last actual sale price. The presence of such specific orders, relative to the last market price, is significant in regard to operation of the system 10, as explained more fully hereinafter in connection with examples of system operation when such orders are not present.

The first basic step in operation of the computation system 10 consists of breaking each order into individual lots and recording each lot order in one of the two sequencer circuits 28 and 29. The buy sequencer circuit 28 is shown in detail in FIG. 2 and the sell sequencer circuit may be essentially similar in construction. When the price determination operation is initiated, gate circuit 19 is actuated by a program control unit 37 and the main data store 18 is also actuated to produce a readout operation. The mechanics of dividing the individual order into lot size, a given lot being taken as 100 shares, is performed by the subtractor circuit 24, which continuously subtracts 100 shares from each order until there are no more shares remaining in that order, each time repeating the recorded word representing the order in the output signal from the subtractor as a part of this process. The buy-sell gate 25 is actuated by the buy-sell indication in the order itself, identifying the nature of the order, so that the individual buy orders, broken down into lot size, are recorded in the lot storage unit 51 of the buy sequencer. Similarly, all sell orders are recorded in a corresponding lot storage unit in the sell sequencer 29.

In the buy sequencer 28, it is necessary to do more than merely record the individual buy orders as they are received. These orders must be rearranged in descending order by price and by time of receipt so that at each price level the oldest orders are uppermost. Although there are many sophisticated circuit arrangements for performing a sorting operation of this kind, the simplest and in many ways most effective consists only of comparing the first lot order recorded in storage unit 51 with the next lot order and re-recording the two orders in reverse sequence in the lot storage unit if and only if the first order is smaller than the second. This process is carried out by comparing the individual recorded orders from the lot storage unit in the comparator 53, which is actuated to read out data from the lot storage unit by the comparator gate 52. Each time a new buy order is recorded in the storage unit 51, the comparator gate control 55 is actuated by the incoming signal and in turn actuates gate 52 to initiate the comparison operation. The accumulator 54 provides the necessary storage, in the re-recording circuit from comparator 53 to storage unit 51, to enable the necessary reversal of orders where the comparator determines that the first order is smaller than the second in the sequence.

After the first comparison operation, the sequence tester 56 is actuated to produce an output signal if an exchange of sequence has been made between the two orders compared in comparator 53. If no exchange has been made, the sequence of orders is correct and no further sorting is required. If an interchange has been made, it is possible that the sequence is not in final order, and the comparison process is repeated for the next two recorded orders. The total number of comparisons for information entered in the lot storage unit 51 cannot exceed the square of the number of items entered therein; in an ordinary commercial situation, the time required for the buy sequencer 28 to complete its operation may be made substantially less than 1 minute.

The same procedure is followed with respect to the sell orders, in the sell sequencer circuit 29 which, as noted above, is essentially similar in construction to the buy sequencer 28. In the sell sequencer, however, the sequence of the compared orders is changed only if the first of the two orders in the sequence is larger than the second. That is, the sell sequencer comparator arrangement is such that the sell orders are arranged in ascending order by price. However, the sell orders are maintained in the original sequence according to their time of entry; so that the second of the two orders at $18.50, for example, in Table 1, is placed after or below the initial order at the same price in the sequence. Thus, the sell orders are recorded in ascending order by price and in descending order by time, the arrangement of buy and sell orders in the sequencer being as follows:

TABLE 2

| Purchase orders | | Sale orders | |
|---|---|---|---|
| | Price | | Price |
| Lots: | | Lots: | |
| 1 | $20.00 | 1 | $17.00 |
| 1 | 20.00 | 1 | 17.50 |
| 1 | 19.50 | 1 | 17.50 |
| 1 | 19.00 | 1 | 17.50 |
| 1 | 19.00 | 1 | 17.50 |
| 1 | 19.00 | 1 | 17.50 |
| 1 | 19.00 | 1 | 17.50 |
| 1 | 19.00 | 1 | 17.50 |
| 1 | 18.50 | 1 | 17.50 |
| 1 | 18.50 | 1 | 17.75m |
| 1 | 18.50 | 1 | 17.75m |
| 1 | 18.50 | 1 | 17.75m |
| 1 | 18.50 | 1 | 17.75m |
| 1 | 18.25m | 1 | 17.75m |
| 1 | 18.25m | 1 | 17.75m |
| 1 | 18.25m | 1 | 17.75m |
| 1 | 18.25m | 1 | 18.00 |
| 1 | 18.25m | 1 | 18.00 |
| 1 | 18.25m | 1 | 18.00 |
| 1 | 18.25m | 1 | 18.00 |
| 1 | 18.25m | 1 | 18.00 |
| 1 | 18.25m | 1 | 18.00 |
| 1 | 18.25m | 1 | 18.00 |
| 1 | 18.25m | 1 | 18.00 |
| B 1 | 18.25m | 1 | 18.00 |
| A 1 | 18.25m | 1 | 18.50 |
| 1 | 18.25m | 1 | 18.50 |
| 1 | 18.00 | 1 | 18.50 |
| 1 | 18.00 | 1 | 18.50 |
| 1 | 17.50 | 1 | 18.50 |
| 1 | 17.00 | 1 | 18.50 |
| 1 | 17.00 | 1 | 18.50 |
| 1 | 17.00 | 1 | 18.50 |
| 1 | 17.00 | 1 | 18.50 |
| 1 | 16.50 | 1 | 18.50 |
| 1 | 16.50 | | |
| 1 | 16.50 | | |
| 1 | 16.50 | | |
| etc. | | | |

Specific mention must be made of the treatment accorded the "at market" orders in the sequencing circuits 28 and 29. Under the rather normal and quiet market circumstances evident from the listing of buy and sell orders in Table 1, the fact that there are buyers and sellers both prepared to sell substantial amounts of shares "at the market" can only be interpreted to indicate that the price they envision, with respect to their orders, is the closing price of $18 for the last sale transaction. Thus, the "at market" bids and offers should be entered in the sequencers 28 and 29 approximately at the previous $18.00 price, but with an effective trading range.

One manner in which this can be done is to enter the "at market" buy orders at a price slightly higher than the last sale price; in the following example, a price of $18.25 is employed. If this is done, the sell orders should be entered at a price correspondingly lower than the last sale price as, for example, $17.75. The increment selected for increasing the buy orders and decreasing the sell orders from the last market price should preferably be no more than the smallest fractional value normally utilized in transactions in the particular market in which the computation system 10 is employed. The resulting sequences of buy and sell orders, as recorded in the two sequencer circuits, are shown in Table 2.

A slightly different arrangement to achieve essentially the same result, with respect to the entry of orders in the sequencer circuit 28 and 29, is to price the "at market" orders at the last sell price, in this instance $18.00, and to utilize the code indication of "at market" orders in the operation of the comparator that establishes the sequence of recording. Thus, the buy orders may be entered at the last price of $18.00 for a sales transaction in the PDQ stock, but the comparator 53 may be utilized, with one or more additional stages, to identify the difference between the market orders at $18.00 and specific orders at the same price. This is done because the placing of these orders "at market" clearly indicates the willingness to pay at least a minimum increment of additional price over the last closing price.

The opposite technique would then be followed with respect to sell orders. Thus, sell orders would be entered at the last price of $18.00 but the comparator for the sell sequencer 29 would be used to identify such market orders as orders to be placed below the corresponding $18.00 specific orders insofar as price sequence is concerned. Since the sell sequence arrangement is in ascending order by price, the market orders to sell at $18.00 are also located ahead of the corresponding specific price orders. The ultimate result places the orders from Table 1 in the sequencers 28 and 29, in an arrangement not basically different from Table 2.

The next operation performed by system 10 is to determine the market price for the next sales transaction, this determination being made by the price comparator 31. This comparator is actuated by the main program control unit 37 upon completion of the sequencing operations described above. It compares the orders stored in the buy sequencer 28 and the sell sequencer 29, starting with the top of the sequenced orders as shown in Table 2. The comparator 31 compares the prices, item by item, until a first incompatible pair A (Table 2) is reached. In the given instance, the first incompatible pair A constitutes an offer to sell the PDQ stock at $18.50, which is in the same position in the comparison sequence with an offer to pay only $18.25. Obviously, this particular transaction cannot be completed because the purchaser is not willing to pay the price demanded by the seller. Determination of this first incompatible pair A signals the system 10 to print out the preceeding price comparison pair B, the last pair of offers to purchase and to sell that are compatible with respect to price. During the comparison operation, all of the purchase and sell orders preceeding the incompatible pair A are recorded, in decoder storage unit 33. Consequently, when the selling price is actually determined, upon reaching the incompatible pair A, then pair B and all preceeding pairs can be appropriately decoded and printed out by the output units 13 and 16 at the two market stations 11 and 14. The actual selling price is $18.25.

PRICE COMPUTATION II

The foregoing example, Price Computation I, as can be seen from the resulting sale price of $18.25, is illustrative of operation of computation system 10 in a steady market. Of course, the market is not always steady; the following example illustrates conditions that may obtain in system 10 in a slowly falling market. Here, and assuming the closing price of $18.00 as before, the orders received and recorded in the main data storage unit 18 following the last sale transaction are as follows:

TABLE 3

| Purchase orders | | Sale orders | |
|---|---|---|---|
| Shares | Price | Shares | Price |
| 500 | $18.25 | 400 | $19.00 |
| 300 | 18.00 | 300 | 18.00 |
| 200 | 18.75 | 100 | 17.75 |
| 300 | 17.75 | 600 | 18.25 |
| 100 | 18.00 | 700 | 17.75 |
| 100 | 17.50 | 300 | 18.00 |
| 1,000 | 17.75 | 2,400 | At specific prices. |
| 2,500 | At specific prices | | |
| 500 | "At market" | 1,200 | "At market." |
| 3,000 | Total | 3,600 | Total. |

Again, it should be noted that there are purchase orders presented at a price equal to and at prices above the last sale price of $18.00; there are also specific sell orders that are priced at and below the last sale price. Consequently, the operation of system 10 proceeds as before and the buy and sell orders are placed in sequence, by sequencers 28 and 29 respectively, in the following manner:

TABLE 4

| Purchase orders | | Sale orders | |
|---|---|---|---|
| Lots: | Price | Lots: | Price |
| 1 | $18.75 | 1 | $17.75 |
| 1 | 18.75 | 1 | 17.75 |
| 1 | 18.25 | 1 | 17.75 |
| 1 | 18.25 | 1 | 17.75 |
| 1 | 18.25 | 1 | 17.75 |
| 1 | 18.25 | 1 | 17.75 |
| 1 | 18.25 | 1 | 17.75 |
| 1 | 18.25m | 1 | 17.75 |
| 1 | 18.25m | 1 | 17.75m |
| 1 | 18.25m | 1 | 17.75m |
| 1 | 18.25m | 1 | 17.75m |
| 1 | 18.25m | 1 | 17.75m |
| 1 | 18.00 | 1 | 17.75m |
| 1 | 18.00 | 1 | 17.75m |
| 1 | 18.00 | 1 | 17.75m |
| 1 | 18.00 | 1 | 17.75m |
| 1 | 17.75 | 1 | 17.75m |
| 1 | 17.75 | 1 | 17.75m |
| D 1 | 17.75 | 1 | 17.75m |
| C 1 | 17.75 | 1 | 18.00 |
| 1 | 17.75 | 1 | 18.00 |
| 1 | 17.75 | 1 | 18.00 |
| 1 | 17.75 | 1 | 18.00 |
| 1 | 17.75 | 1 | 18.00 |
| 1 | 17.75 | 1 | 18.00 |
| 1 | 17.75 | 1 | 18.25 |
| 1 | 17.75 | 1 | 18.25 |
| 1 | 17.75 | 1 | 18.25 |
| 1 | 17.50 | 1 | 18.25 |
| | | 1 | 18.25 |
| | | 1 | 19.00 |
| | | 1 | 19.00 |
| | | 1 | 19.00 |
| | | 1 | 19.00 |

TABLE 5

| Purchase orders | | Sale orders | |
|---|---|---|---|
| Shares | Price | Shares | Price |
| 1,000 | $18.50 | 100 | $19.00 |
| 1,000 | 18.00 | 1,100 | 19.75 |
| 800 | 20.00 | 400 | 19.50 |
| 1,200 | 19.00 | 300 | 19.50 |
| 1,000 | 18.00 | 1,900 | At specific prices |
| 500 | 18.50 | | |
| 5,500 | At specific prices | 600 | "At market" |
| 1,000 | "At market" | 2,500 | Total |
| 6,500 | Total | | |

In this instance, the price comparator 31, in comparing the sequenced buy and sell orders, established pair C as the first incompatible pair of purchase and sale orders. As before, all orders beginning with the first pair D above pair C can be filled and sales transactions completed; consequently, decoder 33 decodes and causes output devices 13 and 16 to print out all of the order pairs above pair C, including the last compatible pair D, and these orders are filled at the newly determined market price of $17.75. This particular example illustrates the importance of the treatment given to the orders entered "at market." Thus, if the selling orders placed "at market" had been entered indiscriminately at the last market price, as if they were specific orders, a distorted price determination would have resulted, which would have failed to indicate the falling nature of the actual market, and the last four lot sales would not have been completed.

PRICE COMPUTATION III

As long as no major unsettling conditions are present, with respect to the market in a particular line of fungible goods such as stock PDQ, the "at market" orders can be used, and should be used, directly in the price computation operation as set forth hereinabove. On occasion, however, with respect to any fungible, marked price fluctuations may occur. For example, with respect to stock PDQ, it may be assumed that following the close of one day's business in the market, favorable news is published with respect to the PDQ Company. In a situation of this kind, there would be relatively few sellers of the PDQ stock and relatively many buyers for purchase of the stock on the next market day. Hence, the change in the business situation can be expected to be reflected in a substantial change in the market price of the stock. The orders to buy and sell, at the beginning of the next day's business, might be as follows:

It is apparent, with the conditions illustrated in Table 5, that the market price of $18.00 for the preceeding day is now a fiction. No stock is offered for sale at $18.00 or less. The lowest sale offer is $19.00 and only amounts to 100 shares. In such a market the expression "at market" cannot mean the previous closing price of $18.00 but refers to the price that will be determined by buyers and sellers who are prepared to price their bids and offers.

It is not necessary for the system operators to apply any separate control actuation to the system 10 to determine the existence of the foregoing market conditions. This is accomplished by the market comparison circuits comprising circuits 38, 39 and 41. Thus, when the program control unit 37 is actuated to make a price determination, and prior to recording of data in the sequencing circuits 28 and 29, the basic data stored in unit 18 is first supplied to market comparator 39 through gate 38. In the market comparator the buy and sell orders are each compared with the closing price of $18.00 registered in the closing price store 32. In the present instance, with business conditions as shown in Table 5, the market comparator determines that there are no offers to sell that are equal to or less than the closing price. Consequently, the comparator produces an output signal that actuates the program control unit 37 to afford an operation in which the "at market" orders are initially omitted from the price determination.

When the program control unit 37 initiates the actual price determination operation, in this instance, the readout of data from the main store 18 proceeds somewhat differently from before. All "at market" orders are now transferred, through gate 19, through the two output circuits 22 and 23, to a subtractor 34. The output of subtractor 34 is supplied to the correction counter 35, which determines the difference in the number of lots of stock offered for sale and ordered for purchase "at market."

The specific price orders, on the other hand, are transferred through the price determination gate 19 to the subtractor 34 and are supplied to the sequencing circuits 28 and 29, through the buy-sell gate 25, in the same manner as before. This results in the sequential recording of the priced purchase orders and sale orders, in the sequencing circuits, as shown in Table 6.

TABLE 6

| Purchase orders | | Sale orders | |
|---|---|---|---|
| Lots: | Prices | Lots: | Prices |
| 1 | $20.00 | 1 | $19.00 |
| 1 | 20.00 | 1 | 19.50 |
| 1 | 20.00 | 1 | 19.50 |
| 1 | 20.00 | 1 | 19.50 |
| 1 | 20.00 | 1 | 19.50 |
| 1 | 20.00 | 1 | 19.50 |
| 1 | 20.00 | 1 | 19.50 |
| F 1 | 20.00 | 1 | 19.50 |
| E 1 | 19.00 | 1 | 19.75 |

TABLE 6 — Continued

| Purchase orders | | Sale orders | |
|---|---|---|---|
| | Prices | | Prices |
| 1 | 19.00 | 1 | 19.75 |
| 1 | 19.00 | 1 | 19.75 |
| 1 | 19.00 | G 1 | 19.75 |
| 1 | 19.00 | 1 | 19.75 |
| 1 | 19.00 | 1 | 19.75 |
| 1 | 19.00 | 1 | 19.75 |
| 1 | 19.00 | 1 | 19.75 |
| 1 | 19.00 | 1 | 19.75 |
| 1 | 19.00 | 1 | 19.75 |
| 1 | 19.00 | 1 | 19.75 |
| 1 | 19.00 | | |
| 1 | 18.50 | | |
| 1 | 18.50 | | |
| 1 | 18.50 | | |
| 1 | 18.50 | | |
| 1 | 18.50 | | |
| 10 more at | 18.50 | | |
| 20 at | 18.00 | | |

The price comparator 31 operates as before to compare the recorded data in the sequencer circuits 28 and 29. The first incompatible pair located by the price comparator 31 is the pair E. As under normal market conditions, the price determination is the price established by the last compatible pair F. But this does not conclude the operation of the computing system, since it does not take into account the "at market" orders, both buy orders and sell orders, that are present.

Instead, at this point in the operation of the computation system, the correction gate 36 is actuated from the program control unit and causes the price comparator 31 to step through the sequence of sell orders by a number of lots equal to the excess of the "at market" buy orders over sell orders, as determined by correction counter 35. In each step, the selling order is compared with the bid price F of $20.00 to make sure that the sell order is still at or below that price. As shown in Table 6, after stepping through four lots, the sell order price G is still $19.75, below the $20.00 bid F. As can be seen from Tables 5 and 6, this makes it possible to move 1200 shares at a price of $20.00 as compared with the preceeding closing price of $18.00, establishing a new market price reflecting the substantial change in business conditions. It should be noted that if there had been a larger number of buyers available "at market," then all of the shares offered could have been sold at the ultimate price determination of $20.00. On the other hand, if there had been further specific orders to sell at prices higher than $20.00, these sales would not have been completed.

SUMMARY OF OPERATIONS

If there is no stock offered for sale at or below the last closing price when business news is good, then it is not possible to establish the next selling price by direct use of the "at market" bids. They must be employed at the end of the computation as described hereinabove in connection with Price Computation III, Tables 5 and 6. On the other hand, if there is no offer to purchase at or above the last closing price when the business news is bad, it is again undesirable to employ the "at market" offers directly in the price computation. Instead, "at market" orders are again placed at the end of the computation, in such a depressed market situation, through the operation of the market comparator and correction counter circuits, employed in exactly the same manner as in the case of a rapid upward market movement.

As pointed out above, the "at market" orders are effectively entered into the computation system at prices determined by the last selling price for the goods. In the illustrated system 10, with the closing price store 32 connected to main store 18, the prices employed for "at market" orders can be computed directly, adding one minimum price increment to the closing price for buy orders and reducing the closing price by one minimum increment for sell orders, by means of relatively simple computing circuits of known type. The same effect could be achieved by having the system operators encode "at market" orders for price, though automatic computation is preferred to reduce the human error factor. Of course, these arbitrary price entries for "at market" orders are discarded, where the "at market" orders do not directly enter into the price determination, as in Price Computation III.

It is not essential that the means employed to inhibit transfer of "at market" orders to the sequencer circuits 28 and 29, in this instance the market comparator 39, program control 37 and price gate 19, be rigidly tied to the closing price in their operation. In a slowly rising or slowly falling market, it may well serve to stabilize the market if some margin is allowed in operation of this inhibiting circuitry. Thus, it is a relatively simple matter to construct comparator 39 to compare the buy orders with a price incrementally lower than the actual closing price and to compare sell orders with a price incrementally higher. Taking an increment of $0.25 with respect to the stock PDQ, in the examples above, the market comparator could permit use of "at market" orders for price determination in the presence of specific buy orders as high as $17.75 and specific sell orders as low as $18.25, without departure from the basic inventive concept. Indeed, a margin provision of this kind can have a salutary effect in stabilizing price fluctuations, providing the price increment is not excessive as compared with the selling price of the goods.

From the foregoing description of the price computation system 10, it is seen that the system is fully automatic in its price determinations and eliminates or minimizes human judgment factors that have heretofore entered into the price determination operation. The system effectively utilizes "at market" orders, both in a relatively steady market and in a market that is rapidly fluctuating either upwardly or downwardly. The market stations 11 and 14 each maintain a complete record of all actual selling transactions. Furthermore, the combined records from the two stations, or such other input stations as are connected to the system, give a complete record of all of the buy and sell orders that are entered into the system. It is particularly important that the system avoids any necessity for the exercise of human judgment, even in a rapidly fluctuating market, and that price determinations are effected fully automatically except in the complete absence of orders either to buy or to sell. Of course, if either buy orders or sell orders are completely absent, then there can be no market.

APPLICATION TO A STOCK EXCHANGE

The above discussion completely discloses the present invention, and fully describes how price computations are performed under varying market conditions. The incorporation of the present invention into a typical data processing system and the use of the resulting price computational system to match buy and sell orders in a stock exchange where 100 different stocks are traded is set forth below.

The stock exchange is assumed to have a central office, and also remote offices some of which may be located in distant towns. A data processing system, such as an International Business Machines 7094 Data Processing System, is located in the central office. This system is connected to input and output devices located in the remote offices both by low speed telegraph lines and also by high-speed data telephone lines, and is connected directly to input and output devices located in the central office and in nearby remote offices by local input party lines.

Market operations in this exchange proceed as follows: Orders are placed either at the central office or at the remote offices during an order period. These orders are transmitted to the system, encoded, and stored in magnetic drum storage units. At the end of the order period, the orders are retrieved from the drum storage units and are traded in accordance with the present invention. Any changes in stock market prices that arise during trading are transmitted back to the trading locations for posting. After all trading is completed, and after all of the new market prices are posted, a new order period beings.

OVERALL SYSTEM—INPUT AND OUTPUT ARRANGEMENTS

A data processing system 100 suitable for use in this exchange is illustrated diagrammatically in FIG. 4. The system 100 includes a central processing unit 102, a core memory 104, a multiplexer 106, and five data channels 108, 110, 112, 114, and 116. One of the data channels 108 is used to control the operation of a printer 118, a card reader 120, a card punch 122, and a number of magnetic tape units 124. The data channel 108 is used primarily to feed new programs into the system 100 and is also used when bookkeeping records of the day's trading are to be processed. The magnetic tape units associated with the data channel 108 contain the various order and trading control programs, and also other programs which may be executed in the system 100 during the evenings and at other times when trading is not in progress. Bookkeeping information can also be stored in one of the magnetic tape units 124, if desired. The data channel 116 is connected to a file control 125 which in turn is connected to five magnetic drum storage units 126, 128, 130, 132 and 134. The data channels 110, 112, and 114 are connected to three input-output synchronizers 136, 138, and 140 which in turn are connected to a variety of data transmission systems.

The input-output synchronizer 136 is connected by two lines 142 and 144 to a local input party line 146 (FIG. 5A). This local input party line 146 connects up to 10 nearby input and output units 147, 149, and 151 in FIG. 5A. Only one of the input and output units 147, 149, and 151 connected to the single local input party line 146 can be used at a time. The units 147, 149 and 151 may be up to 8 miles from the system 100. The synchronizer 136 is also connected by two lines 148 and 150 to a second local input party line 152 that is similar to the local input party line 146 shown in FIG. 5A. A suitable input and output unit for use in the local input party lines 146 and 152 would be an International Business Machines 1014 Remote Inquiry units.

The input-output synchronizer 136 (FIG. 4) is also connected by two lines 154 and 156 to a high-speed data transmission unit 158. The high-speed data transmission unit 158 is connected to a data telephone 160 that can communicate over conventional telephone lines with another data telephone 162 in FIG. 5C located in a remote office 164.

As is shown in FIG. 5C, the data telephone 162 is connected to a number of input and output units 166, 168 and 170, by a transceiver 176. The details of such a transmission system are described in an article by J. J. Feldman entitled "The Howard Savings Institution—A Case History in Real-Time Data Processing" published in the IEEE Transactions on Communication and Electronics, No. 67, on pages 367—372 (July 1963).

The input-output synchronizer 138 (FIG. 4) is connected by two lines 178 and 180 to a second data transmission unit 182 that in turn is connected to a data telephone 184. The data telephone 184 also can communicate over conventional telephone lines with a data telephone located in another remote office (not shown) similar to the remote office 164 shown in FIG. 5C. In a similar manner, the input-output synchronizer 140 (FIG. 4) is connected by two lines 186 and 188 to a third data transmission unit 190 that in turn is connected to a data telephone 192. The data telephone 192 can also communicate over conventional telephone lines with a data telephone located in another remote office (not shown) similar to the remote office 164 shown in FIG. 5C.

The input-output synchronizer 138 (FIG. 4) is connected to a first telegraph input-output unit 194 by two lines 196 and 198, and to a second telegraph input-output unit 200 by two lines 202 and 204. These telegraph input-output units 194 and 200 include telegraph lines that extend to individual input and output units located in remote offices. FIG. 5B shows the telegraph input-output unit 194 in more detail. The lines 196 and 198 can be of any length. A remote input and output unit 197 is located at the end of the lines 196 and 198. The unit 197 is a telegraph transmitter and receiver of conventional design.

The input-output synchronizer 140 (FIG. 4) is also connected to two telegraph input-output units 206 and 208. Connection to the unit 206 is by two lines 210 and 212, while connection to the unit 208 is by two lines 214 and 216. The units 206 and 208, and also the unit 200, are identical to the unit 194 shown in FIG. 5B.

The above-described equipment, except for the data telephones, is all available as standard accessories to an International Business Machines 7094 Data Processing System. Specific model numbers and specific details can be found in the publication "IBM 7094 Data Processing System—Principles of Operation" 1962 edition, published by International Business Machines Corporation, Data Processing Division, 112 East Post Road, White Plains, New York, 10601. A suitable data telephone for use in this system is the one manufactured by Western Electric Company, Incorporated for the Bell System.

FUNCTIONS PERFORMED BY SYSTEM ELEMENTS

The central processing unit 102 (FIG. 4) functions as the program control 37 (FIG. 1) and also as the comparator gate control 55 (FIG. 2). A program controllable arithmetic accumulator within the central processing unit 102 (FIG. 4) performs the functions of the counter 35 (FIG. 1), the subtractor 34 (FIG. 1), the price comparator 31 (FIG. 1), and the sorting comparator 53 (FIG. 2). Two program controllable index registers 300 and 302 (FIG 7) within the central processing unit 102 (FIG. 4) serve as shift registers in the market comparator 39 (FIG. 1 and 7), and a third index register performs the functions of the subtractor 24 (FIG. 1). Program controllable gating circuitry within the central processing unit 102 performs the functions of the gates 17, 19, 25, 36, 38 and 42 in FIG. 1, and also performs the functions of the gate 52 in FIG. 2. Encoding and decoding of orders is performed partially by the input and output units 147, 149, 151, 166, 168, 170 and 197 (FIG. 5), partially by the input-output synchronizers 136, 138, and 140 (FIG. 4), and partially by the central processing unit 102 (FIG. 4) under program control. The five magnetic drum storage units 126—134 (FIG. 4) function as the main data storage 18 in FIG. 1. The core memory 104 replaces all other memory elements of the system 10 (FIG. 1), and also serves as a storage location for the current values of the correction counters for the 100 stocks.

ARITHMETIC OPERATIONS

Unless otherwise noted, all arithmetic operations are performed within the system 100 using binary arithmetic, in accordance with the principles set out in chapter 4 of *Arithmetic Operations in Digital Computers* by R. K. Richards, published in 1955 by D. Van Nostrand Company, Incorporated. Subtraction operations are sometimes performed by adding the 2's complement (or the 1's complement plus "1") of the subtrahend to the minuend, in accordance with the theory of subtraction by addition of complements that is set out on pages 124—128 of the book by Richards, and in the publication "IBM 7094 Data Processing System—Principles of Operation" cited above.

The comparison tests are performed by subtracting one number from the other and then sensing the sign of the remainder in accordance with the method described by Richards on page 290.

THE CENTRAL PROCESSING UNIT

The internal structural details of the central processing unit 102 are not shown. Such units are commonly found in digital computers, and a detailed description of the unit supplied with a particular data processing system can be obtained from the manufacturer. In the following description, unless otherwise indicated, it is assumed that the central processing unit 102 is the combination of an International Business Machines 7110 Instruction Processing Unit with an International Business Machines 7109 Arithmetic Sequence Unit. A detailed description of the unit 102 can be found in the publication "IBM 7094 Data Processing System—Principles of Operation" cited above.

In general, the unit 102 can store data in the core memory 104; can retrieve data from the core memory 104; can order the data channels 110— 116 to transfer data between the core memory 103 and various external devices; and can perform any arithmetic, comparison, shifting, or logical operation that may be required, all under program control. The unit 102 contains two or more index registers, which are binary number storage registers having a 15-bit storage capacity. The unit 102 also contains at least one arithmetic accumulator similar to those described by Richards on pages 98—113 and also on page 124, and capable of performing binary addition and subtraction. This arithmetic accumulator is also a shift register in which binary information can be shifted to the right or to the left, and in this respect is similar to the shift registers described by Richards on pages 144—146.

PROGRAMS AND PROGRAM CONTROL

Any operating program or combination of operating programs that can guide the system 100 in the performance of the steps described below may serve in combination with the central processing unit 102 as the program control 37 (FIG. 1) and as the comparator gate control 55 (FIG. 2). The operating program also controls the arithmetic accumulator in the performance of the various addition, subtraction, comparison, gating, and encoding functions that are required.

An operating program consists of a large number of instructions which collectively describe in great detail each step that the system 100 must perform. A suitable set of instructions is described in detail in the publication "IBM 7094 Data Processing System—Principles of Operation" cited above. No useful purpose can be served by presenting a sample program here, since such a program would be extremely lengthy, and any programmer skilled in programming a large data processing system could write the necessary programs after having studied the material presented here.

CORE MEMORY STORAGE ALLOTMENT

The core memory 104 (FIG. 4) in the system 100 includes 32,768 binary 36-bit storage locations. FIGS. 8A, 8B, and 8C illustrate one of the many possible ways in which data associated with the present invention can be stored within these storage locations.

In each of the figures, the boxes represent individual 36-bit storage locations. Numbers and letters beneath the boxes, where shown, represent bit locations within the individual storage locations. The bit location farthest to the left within each 36-bit storage location is labeled the "S" or "sign" bit location; the remaining bit locations are assigned consecutive numbers from "1" to "35" proceeding from left to right. Thus, the leftmost bit location in each storage location is labeled "S"; the next bit location to the right is labeled "1"; the next bit location to the right is labeled "2"; and so on. The rightmost bit location in each storage location is labeled "35." Each storage location is assigned a storage location number between "0" and "32,767." In FIGS. 8A, 8B, and 8C, the number assigned to each storage location is placed to the left of the box representing that storage location.

In FIG. 8A, many of the boxes are broken into sections. The bit locations associated with each section have been indicated. For example, the box associated with storage location number 1,175 is broken into four sections: a first section that includes the bit locations S through 20; a second section that includes the bit location 21; a third section that includes the bit location 35. and a fourth section that includes the bit locations 23 through 35.

In FIG. 8A, many boxes and sections of boxes contain letters, numbers, or symbols. These letters, numbers, and symbols indicate the information content of the corresponding storage locations. Whenever a letter occupies a 6-bit section of a box, it is understood that the letter is stored in the form of a binary coded decimal (BCD) character in accordance with the conventional 6-bit alphanumeric BCD code. Whenever an integer occupies a section of a box, it is understood that the integer is stored in the form of a simple binary number.

Whenever a mixed number (integer plus a fraction) occupies a section of a box, it is understood that the mixed number is stored in the form of a fixed point binary number, and the point is located three bit locations from the right end of the binary number. For example, the bit locations 23 through 35 of the box corresponding to the storage location number 1,175 contain the mixed number "12⅞." In binary form, "12" becomes "1,100," and "⅞"becomes "0.111." Hence, the fixed point binary number actually occupying the bit locations 23 through 35 is "0,000,001,100.111."

Whenever a plus sign occupies the S-bit location of a box, it is understood that a "0" is stored in the S-bit location of the corresponding storage location. Whenever a minus sign occupies the S-bit location of a box, it is understood that a "1" is stored in the S-bit location of the corresponding storage location.

At all times a part of the core memory 104 (FIG. 4) contains operating programs that control the operation of the system 100. These operating programs may also be partially stored on magnetic tape within the magnetic tape units 124, especially during those times when most of the core memory 104 is needed for the sorting and the trading of orders. The operating programs may be stored in any area within the core memory 104 that is not being used for some other purpose.

Referring now to FIG. 8A, three 100-word blocks of core storage locations are indicated. The first is a stock index storage block 250, the second is a closing price storage block 252, and the third is a correction counter storage block 254. The stock index storage block 250 includes the 100 storage locations numbered, 1,001 through 1,100. Each of these 100 storage locations contains the BCD representation of a three letter abbreviation for one of the 100 stocks. Storage location 1,001 for example, contains the three letters "AAT," which could stand for Amalgamated American Transportation. When an order is received by the system 100, the letter code corresponding to the stock covered by the order is compared to the abbreviations stored in the stock index storage block 250. If no match is found, the order is rejected as defective. If a match is found, the order is assigned a stock number between 1 and 100. This stock number is the number of the storage location within which a matching combination of letters was found minus "1,000." Assume, for example, that the system 100 receives the typical order illustrated in FIG. 3. The system compares the letters "PDQ" to those stored in the storage locations 1,001 through 1,100, and finds a matching combination "PDQ" in storage location number 1,075. The order is now assigned the stock number "75" which is "1,075" minus "1,000." Within the system 100, all stocks are identified by stock number rather than be letter code. The stock index storage block is an arbitrary feature of the system 100. Alternatively, stock numbers could be included with each order when placed, and the storage block 250 could be omitted.

The closing price storage block 252 (FIG. 8A) includes the 100 storage locations numbered 1,101 through 1,200. Each storage location within the block 252 contains the market price or the most recent closing price, and also the most recently updated result of the market comparison tests, for one of the 100 stocks. The number of the storage location containing the market or closing price and the market comparison tests result for any particular stock is found by adding "1,100"to the stock number assigned to the stock. For example, closing price information on the stock PDQ is stored in a storage location having the location number "75" plus "1,100"or 1,175. Bit locations 23 through 35 of the location 1,175 contain the closing price for the stock "PDQ," "186⅛." Bit locations 21 and 22 contain the most recently updated result of the market comparison tests for the stock "PDQ," "01."

The correction counter storage block 254 includes the 100 storage locations numbered 1,201 through 1,300. This block 254 contains the current values of the correction counter for each of the 100 stocks. The number of the storage location containing the current value of the correction counter for any particular stock is found by adding "1,200" to the stock number assigned to the stock. For example, the current value of the correction counter for the stock "PDQ" is stored in storage location number "75" plus "1,200" or 1,275.

The storage blocks shown in FIG. 8A are preferably permanent, and are not reassigned for other uses than those described above. Other blocks of core storage are used in different ways at different times. A typical storage block may be alloted to the storage of incoming orders during the order period, to lot storage during the trading period, and to the storage of outgoing orders during the period when the results of trading are being returned to the output units.

During the trading period, almost all of the available core storage blocks are included within the lot storage areas and the "at market" storage areas, as shown in FIGS. 8B and 8C.

COLLECTION AND ENCODING OF ORDERS

As was explained above, orders are submitted to the various system inputs during an order period. Each order consists of an order word such as the typical order word shown in FIG. 3. The various input circuits (FIG. 5A, B, and C) transmit the orders to the input-output synchronizers 136, 138, and 140 where they are temporarily stored in BCD form.

The central processing unit 102 of the system 100 periodically checks the input-output synchronizers 136, 138, and 140 for the presence of completed orders. When a completed order is discovered within one of the synchronizers 136, 138 or 140, the central processing unit 102 instructs the data channel 110, 112, or 114 associated with the synchronizer to transfer the order from the synchronizer to the core memory 104. When an order is first placed in the core memory 104, it is still a string of letters and numbers, as illustrated in FIG. 3.

The central processing unit 102 completes the task of encoding the order. First, the stock number of the order is determined in the manner described above. Next, two 36-bit order words, such as two typical order words 220 and 222 shown in FIG. 6, are generated by the central processing unit 102 under program control. These two order words contain all the information that is needed to trade the order during the trading period.

The first 36-bit order word 220 (FIG. 6) contains the lot size, or the number of shares to be traded; the price at which the shares are to be traded; information as to whether the order is an "at market" order or a fixed price order; and information as to whether the order is a "buy" order or a "sell" order. The lot size number is a binary number that occupies bit locations 1—21. The selling price per share, or the 1's complement of the buying price per share, is a fixed point binary number that occupies bit locations 23—35, with the point falling between bit locations 32 and 33. A "1" occupies bit location S if the order is an "at market" order; a "0" if the order is a fixed price order. A "1" occupies bit locations 22 if the order is a buy order; a "0" if the order is a sell order. In the case of an "at market" order to sell, the current market price minus one-eighth unit is used as a selling price; in the case of an "at market" order to buy, the current market plus one-eighth unit is used as a selling price. The additional one-eighth unit gives the "at market" orders a small trading margin, in accordance with one feature of the present invention. A larger trading margin can be provided, if desired.

The second 36-bit order word 222, (FIG. 6) contains the identity code number and the station number. The identity code number of the broker or trader occupies bit locations 1-—22 as a binary number, and the number of the station or input at which the order was placed occupies bit locations 23-—35 as a binary number.

The typical 36-bit order words 220 and 222 in FIG. 6 are derived from the typical order word shown in FIG. 3. In the first 36-bit order word 220: The "0" occupying bit location S indicates an order to trade at a fixed price; the number "400" occupying bit locations 1—21 indicates an order to trade 400 shares, four trading units of 100 shares each; the "1" occupying bit location 22 indicates an order to buy; and the fixed point binary number "1,101,000,110.111" occupying bit locations 23—35 is the 1's complement of "185 0/8," and indicates a trading price of 185 units per share. In the second 36-bit order word 222: The number "1,437" occupying bit locations 1—22 is the identity code of the broker or trader; the number "2" occupying bit locations 23—35 is the number of the remote unit or station at which the order was placed.

Within the system 100, all trading and market prices are represented by fixed point 13-bit binary numbers, and the point always separates the three least significant bits from the 10 most significant bits. For example, the price "147⅝" becomes "0,010,010,011.101" where "10,010,011." is the binary representation of "147" and ".101" is the binary representation of "⅝"; the price "63" becomes "0,000,111,111.000" where "111,111." is the binary representation of "63" and ".000" is the binary representation of "0/8."

In accordance with the conventional practice, the 1's complement of a binary number is formed by changing all "0"'s to "1"'s and by changing all "1"'s to "0"'s. For example, the 13-bit fixed point binary representation of the price "185" is "0,010,111,001.000 where "10,111,001." is the binary representation of "185" and ".000" is the binary representation of "0/8." The 1's complement of this is then "1,101,000,110.111." This is the number that occupies bit locations 23—35 of the first 36-bit order word 220 shown in FIG. 6.

The reason for placing the 1's complement of the price accompanying an order to buy into bit locations 23—35 of the first 36-bit order word 220 (FIG. 6) is to simplify the design of the market comparator 39 (FIG. 7). The market comparator 39 includes a complement subtractor circuit; this subtractor circuit is actually an adder circuit 310 in which a minuend, the 1's complement of a subtrahend, and "1" are added together. This is in accordance with the customary practice in the computer field of performing subtraction by complement addition. Since the price accompanying an order to buy is the subtrahend in the market comparison test, it is convenient to have this price available in 1's complement form. This is an optional feature. If desired, the price accompanying an order to buy can be kept in normal form, and the comparator programs and circuits can be modified accordingly. An explanation of complement arithmetic can be found in the publication "IBM Data Processing System—Principles of Operation" cited above, and in chapter 4 of the book by Richards cited above.

Having finished encoding an order, the system 100 next updates the correction counter for the stock being traded if the order is an "at market" order, or subjects the order to the market comparison test if the order is a fixed price order.

If the order is an "at market" order, the correction counter is updated. The number of the storage location that contains the correction counter value for the stock to be traded is determined by adding "1,200" to the stock number, as was explained above. The number stored in this location is retrieved and is placed into an arithmetic accumulator within the central processing unit 102 (FIG. 4). This arithmetic accumulator now functions as a correction counter. It contains a number equal to the total number of shares included in the "at market" orders to buy, less the total number of shares included in the "at market" orders to sell, which have been received during the current order period. If the current order is an "at market" order to buy, a number equal to the number of shares which are to be purchased is added to the contents of the accumulator. If the current order is an "at market" order to sell, a number equal to the number of shares which are to be sold is subtracted from the contents of the accumulator. The contents of the accumulator are then returned to the storage location determined by adding "1,200" to the stock number. This completes the procedure for updating the correction counter.

If the order is a fixed price order, the market comparison test is carried out. First, the information contained in bit locations 21—35 of the first 36-bit order word 220 (FIG. 6) is transferred to a buy-sell price index register 302 (FIG. 7). Next, the number of the storage location containing the most recent closing price for the stock to be traded is determined. This is done by adding "1,100" to the stock number of the stock to be traded, as was explained above. Finally, the information stored in bit locations 21—35 within this storage location is transferred into a market price index register 300 (FIG. 7). These transfers are performed by the central processing unit 102 (FIG. 4) under program control. When these two transfers have been completed, the market comparator 39 (FIG. 7) automatically carries out the market comparison test. The result of this test is automatically placed in the first two bit locations within the market price index register 300. The information contained in the market price index register 300, including the newly updated result of the market comparison test, is now transferred back into the storage location that was determined by adding "1,100" to the stock number. This completes the market comparison test.

In the system 100, the market comparison test is performed at the time when a fixed price order is received. The test could just as well be carried out upon all fixed price orders for a given stock just before that stock is traded. In the system 100, the correction counters for the various stocks are updated at the time when an "at market" order is received. The correction counter could just as well be updated as the "at market" orders for a particular stock are transferred into the "at market" order storage areas, during the trading period.

After the market comparison test has been performed or after the correction counter has been updated, the two 36-bit order words representing an order are stored within one of the five magnetic drum storage units 126, 128, 130, 132, or 134. The total drum storage area is divided into 100 locations, and one location is assigned to each type of stock. Since orders for different stocks are stored in different locations, the two 36-bit order words do not have to contain information as to what stock is to be traded. Orders for a given stock are stored serially within a storage location in the order in which they are received and therefore the two 36-bit order words do not have to contain consecutive numbers or order numbers. If desired, a third order word containing the above information can be generated, and then three 36-bit order words can be used to represent each order instead of two. If three order words are used in this manner, the orders may be stored randomly throughout the drum storage area, rather than in locations assigned to particular stocks.

For the duration of the order period, the system 100 continually accepts, encodes, and stores orders as they are received from the system inputs. At the end of the order period the system 100 continues to accept orders which have already been received in part, but rejects all other orders. When all of the orders have been encoded and stored, the trading period begins.

TRADING OF ORDERS

During the trading period, the system 100 trades each of the 100 stocks listed on the exchange, starting with the stock having the stock number "1" and proceeding serially through the entire list of stocks. The procedure for trading any given stock involves the following steps: Checking the result of the market comparison tests for the given stock; retrieving the orders for the given stock from drum storage; arranging the orders within the lot storage areas; matching the orders; determining a new market price; and returning the traded orders to drum storage. After all of the 100 stocks have been traded, the final step in the trading procedure is that of returning the orders to the system 100 outputs.

The first step in trading a given stock is that of checking the result of the market comparison tests for the stock. The result of the market comparison tests for a given stock is stored in bit locations 21 and 22 of the storage location that contains the most recent closing price for the given stock. This storage location is within the closing price storage block 252 (FIG. 8A), and the number of this storage location may be calculated by adding "1,100" to the stock number of the given stock. The market comparison tests result is retrieved from storage by transferring the contents of this storage location into an arithmetic accumulator within the central processing unit 102 (FIG. 4), and by then shifting the contents of the accumulator 13 bit positions to the right, discarding the overflow bits. The result of the market comparison tests will then be present within the accumulator in the form of a 2-bit binary number.

If the result of the market comparison tests is "11," this indicates a relatively stable market. In this case, the "at market" orders are placed into lot storage along with the priced orders. The available core storage locations are divided into two storage areas, a sell order lot storage area 256, and a buy order lot storage area 258, as shown in FIG. 8B. If the result of the market comparison tests is "10" or "01," this indicates a market that has shifted significantly since the last trading session. In this case the "at market" orders are placed into "at market" storage areas that are separate from the lot storage areas. The available core storage locations are divided into four storage areas, a sell order lot storage area 260, a buy order lot storage area 262, a sell order "at market" storage area 264, and a buy order "at market" storage area 266, as shown in FIG. 8C.

If the result of the market comparison tests is "00," this indicates either that no priced orders have been received, or that the priced orders received do not properly define the trend of the market. In either case, the "at market" orders are placed into the lot storage areas along with the priced orders, as is done when the market comparison test indicates a relatively stable market. However, the market price for the stock is not altered after the orders have been matched, since any change in the market price resulting from trading under these conditions cannot reflect a true market price trend.

The remaining steps in trading a given stock are those of retrieving the orders for the given stock from drum storage, arranging the orders sequentially within the lot storage areas, matching the orders, determining a new market price and returning the traded orders to drum storage.

To illustrate a typical operation, it is assumed that the order period has just ended, and that the system 100 is now ready to retrieve and to arrange the orders to buy and to sell the stock AAT. AAT is the first stock listed in the stock index 250 (FIG. 8A), and is also the stock having the stock number "1." The result of the market comparison tests for the stock AAT is "11."This result is stored in bit locations 21—22 of the storage location number 1,101 (FIG. 8A) in accordance with the storage arrangement described above. The result "11" indicates that the market for the stock AAT is relatively stable, and that therefore the "at market" orders to trade the stock AAT are to be placed into lot storage along with the priced orders in accordance with the storage arrangement illustrated in FIG. 8B. The sell orders are placed in the sell order lot storage are 256, and the buy orders are placed in the buy order lot storage area 258. The sell order lot storage area 256 begins with storage location 2,000 and runs through storage location 13,999. The buy order lot storage area 258 begins with storage location 14,000 and runs through storage location 25,999.

The system 100 now begins to retrieve and to sort the orders to trade the stock AAT. Let it be assumed that the first order is retrieved from drum storage by the system 100, and that it is an order to sell 100 shares of the stock AAT. When first retrieved from core storage, this order will be in the form of two 36-bit order words as illustrated in FIG. 6. Bits 23—35 of the first 36-bit order word, those bits containing the price information, are stored in bit locations 23—35 within the storage location 2,000 of the sell order lot storage area 256 (FIG. 8B). The second 36-bit order word is stored as a unit in the storage location 2,001 adjacent the storage location 2,000 where bits 23—35 of the first 36-bit order word are stored. The first order has now been placed into the sell order lot storage area 256. Bits S—22 of the first 36-bit order word may be discarded.

Assume that a second order is retrieved from drum storage, and that it is an order to buy 1,000 shares of ATT stock. This order will also be in the form of two 36-bit order words as shown in FIG. 6. Since this order represents 10 trading units (100 shares per trading unit), this order is duplicated and placed into 10 consecutive pairs of storage locations within the buy order lot storage area 258, (FIG. 8B). Bits 23—35 of the first 36-bit order word are stored in the storage location 14,000, and also in the locations 14,002, 14,004, 14,006, and so on until they have been placed into 10 storage locations. The second 36-bit order word is stored as a unit in the storage location 14,001, and also in the locations 14,003, 14,005, 14,007, and so on until it has been placed into 10 storage locations. Any convenient means can be used to keep track of how many times an order has been placed into storage. For example, in the above case the number "10" could have been placed into an index register within the central processing unit 102, and this number could have been reduced by one each time the order information was placed into another pair of storage locations. A zero in this index register would then have meant that the storage process for that order had been completed. An index register used in this manner is performing the function of the subtractor circuit 24 in FIG. 1.

Assume that the next order is retrieved from drum storage, and that this order is another order to sell 100 shares of the stock ATT. This third order is placed in storage locations 2,002 and 2,003 within the sell order lot storage area 256 adjacent the storage locations where the first order is stored. The system 100 now places the contents of the location 2,000 into an arithmetic accumulator within the central processing unit 102, and subtracts from this number the contents of the location 2,002. The remainder in the accumulator can now be used to determine which of the two storage locations 2,000 or 2,002 contains the higher number. If the number stored in the location 2,000 is larger than the number stored in the location 2,002, a positive number will remain in the arithmetic accumulator. If the number stored in the location 2,000 is smaller than the number stored in the location 2,002, then a negative number will remain in the accumulator. If the numbers stored in the location 2,000 and in the location 2,002 are of the same value, then zero will remain in the accumulator.

In accordance with the present invention, it is desired to arrange orders within the sell order lot storage area 256 so that the order having the lowest price occupies the locations 2,000 and 2,001. Hence, if the order occupying the locations 2,002 and 2,003 is a lower priced order than the order occupying the locations 2,000 and 2,001, the two orders must be interchanged. In this case, a positive number will remain within the accumulator. The presence of a positive number within the arithmetic accumulator can therefore be used as a test of whether or not the order stored in the locations 2,000 and 2,001 should be interchanged with the order stored in the locations 2,002 and 2,003. The arithmetic accumulator of the central processing unit is thus able to function as an order sequence comparator and thus performs the job of the comparator 53 in FIG. 2. If desired, a special order sequence comparator including two shift registers and subtraction circuitry can be added to the system 100, just as a special market comparator 39 (FIG. 7) has been added to the system 100. The use of an arithmetic accumulator as a comparator is a matter of convenience.

The system 100 continues to bring forth orders from drum storage and to place them in the buy and sell order lot storage areas 256 and 258 (FIG. 8B) until all the orders to trade the stock ATT have been retrieved. Each time a new order is brought forth and placed in one of the lot storage areas 256 or 258, it is interchanged with the orders adjacent itself until it finds its proper position among the other orders in accordance with the present invention. The test for determining whether or not sell orders should be interchanged is performed in the manner described above. The exact same test is used to check the sequencing of the buy orders, so that after sequencing the location 14,000 contains the lowest number, the location 14,002 contains the next lowest number, and so on. Since the contents of the location 14,000 is the 1's complement of the price accompanying an order to buy, the buy orders are thus arranged so that the order to buy at the highest price occupies the locations 14,000 and 14,001, the order to buy at the next highest price occupies the locations 14,002 and 14,003 and so on. Orders having identical prices are stored in the order in which they were received, since the sequencing of such orders is not altered.

When all of the orders pertaining to stock ATT have been retrieved, the matching of orders and the price comparison procedure begins. Once again, an arithmetic accumulator within the central processing unit 102 (FIG. 4) is used as a comparator, and in this application functions as the price comparator 31 (FIG. 1). The price accompanying the sell order is occupying the locations 2,000 and 2,001 is first compared with the price accompanying the buy order occupying the locations 14,000 and 14,001. If the price accompanying the sell order is lower than or equal to the price accompanying the buy order, then the orders can be traded. A record of this fact is made by placing a "1" in the bit location S of both the storage location 2,001 and of the storage location 14,001. Next, the price accompanying the sell order occupying the locations 2,002 and 2,003 is compared with the price accompanying the buy order occupying the locations 14,002 and 14,003.

This comparison procedure is repeated until an incompatible pair is found, i.e., pair in which the price accompanying the sell order is higher than the price accompanying the buy order. When such an incompatible pair is encountered, all possible trades have been carried out. The price accompanying the lowest priced order to buy that was successfully traded is now adopted as the trading price for all of the compatible pairs. This price is found in 1—s complement form stored in the first of the two storage locations occupied by the lowest priced order to buy that was successfully traded. This price also becomes a new closing price, and is stored in the storage location number 1,101 within the closing price storage area 252 (FIG. 8A). If the new closing price is different from the prior closing price, the new closing price is placed in a special section of core storage where all market price changes are recorded. (If the result of the market comparison tests had been "00," no change would be made in the former closing price or market price, as noted above). Storing a new closing price in the location 1,101 automatically sets bits 21 and 22 of the location 1,101 to "00," thus preparing the location 1,101 for the market comparison tests to be performed during the next order period.

The system 100 now returns the orders to drum S-bit The order stored in the storage locations 2,000 and 2,001 is combined with any other adjacent orders having the same identify code and station number, and is returned to storage within the magnetic drum storage units 126—134. The format of the orders when returned to drum storage is almost identical to the format illustrated in FIG. 6 except that the price accompanying orders that were successfully traded is the newly determined closing price for the stock ATT, and successfully traded orders will now have a "1" in the S bit location of the second 36-bit order word. The lot size may be altered, since all of the shares included in an original single order may not have been successfully traded. The successfully traded and the unsuccessfully traded sections of a single order are returned to storage separately. If all of the shares included in the original order were either successfully traded or were not successfully traded, then the lot size number will be the same as when the order was retrieved from drum storage.

The system 100 now proceeds to trade orders pertaining to the stock APL. This is the second stock listed in the stock index 250 (FIG. 8A), and is also the stock having the stock number "2." The system 100 examines the market comparison tests result stored in bit locations 21 and 22 of the storage location 1,102. For this stock, the result is "01." This indicates that market conditions have significantly changed since the last trading session, and that the "at market" orders are not to be traded at the prior closing or market price. The system 100 therefore sets up four storage areas as is shown in FIG. 8C: A sell order lot storage area 260; a buy order lot storage area 262; a sell order "at market" storage area 264; and a buy order "at market" storage area 266. Priced orders are retrieved from drum storage and are placed in the lot storage areas in the same manner as was described above, but "at market" orders are now placed in separate storage areas. There is no need to rearrange the "at market" orders in accordance with price, since they will all carry the same price. The priced orders still must be rearranged and sequenced as was described above.

After all orders for the stock APL have been retrieved and sequenced, the priced orders are matched, and a new market price is determined in the manner described above.

The correction counter for the stock APL is now checked. The value of the correction counter for the stock APL is stored in the storage location 1,202 in accordance with the storage location convention described above. The counter value is "+1,100," and it indicates that the number of 100-share lot orders to buy the stock APL at the market price exceeds the number of 100-share lot orders to sell the stock APL at the market price by 11 100-share lots. It may be possible to successfully match these lots with priced lot orders within the sell order lot storage area.

The system 100 proceeds to match "at market" orders to buy the stock APL with priced orders to sell the stock APL, proceeding sequentially through the respective storage areas, until either an incompatible pair is found, until 11 100-share lots have been matched, or until no more priced orders to sell remain. These "at market" orders to buy are given a trading price equal to the new market price plus one-eighth for the purposes of this price comparison procedure.

Had the correction counter value been negative, "at market" orders to sell would have been matched with fixed priced orders to buy, and the trading price of the "at market" orders to sell would have been the new market price minus one-eighth.

When this has been done, the system 100 proceeds to match the remaining "at market" buy and sell orders with one another, proceeding sequentially, until all of the "at market" orders have been traded, or until one or the other of the "at market" storage areas 264 and 266 is exhausted. No price comparison test is needed, since these orders are all compatible and can all be traded. The orders are then returned to drum storage in the manner described above with a "1" appearing in the S-bit location within the second order word of all orders that were successfully traded.

The price comparison test is performed by subtracting the price accompanying a lot order to buy from the price accompanying a lot order to sell, and then checking the result for the presence of a positive remainder. As explained above, a positive remainder indicates an incompatible pair. In accordance with the usual practice in the computer field, this test can be conveniently carried out in an arithmetic accumulator within the central processing unit 102 (FIG. 4) using complement arithmetic. The 2's complement of the price accompanying a lot order to buy is added to the price accompanying a lot order to sell within the accumulator. These prices are both in the form of 13-bit binary numbers. A positive remainder is indicated by an overflow carry bit that appears within the accumulator in a 14 bit position. The absence of such an overflow carry bit indicates a successful matching of lot orders, while the presence of such an overflow carry bit indicates the two lot orders are incompatible and cannot be traded.

The presence or absence of such an overflow bit can be ascertained by right-shifting the contents of the accumulator 13 bit positions, discarding the overflow, and then checking for the presence of a nonzero bit. This use of an overflow carry bit to indicate a change in sign is in accordance with the discussion on page 128 of the book by Richards, cited above. Richards indicates that an overflow or end around carry occurs when the sign of the balance changes. Note that "1" was not added to the accumulator, and also that an end-around carry is not used. Therefore, in accordance with the principles of complement arithmetic, the number in the accumulator after a price comparison test is actually one unit less than $2^{13}$ plus the difference between the prices of the two orders. This means that no overflow carry bit appears when the two orders are identically priced. This is the desired result. The use of an arithmetic accumulator as a price comparator is a matter of convenience. If desired, a special price comparator including two shift registers and subtraction circuitry can be added to the system 100, just as a special market comparator 39 (FIG. 7) has been added to the system 100.

The system 100 continues to trade the stock sequentially until all have been traded, excepting those for which no orders to trade are present. When trading is finished, the system 100 transmits the successfully traded orders back to the originating input and output units. Orders that were not successfully traded may either be discarded, returned along with the successfully traded orders, or held over until the next trading period. The system 100 withdraws the orders several at a time from disc storage, decodes them, stores them in the core memory 104, and instructs the data channels to remove the orders from the core memory 104 and to transmit the orders back to the remote outputs. When this task is finished, the computer withdraws the newly changed market prices from drum storage and transmits the changed prices to all of the remote locations. This completes the trading procedure. A new order period can now be commenced.

THE MARKET COMPARATOR

In the system 100 (FIG. 4), the price comparison and the lot storage sequence comparison tests are performed within the central processing unit 102 (FIG. 4). The market comparison test is performed within a separate market comparator 39 which is shown diagrammatically in FIG. 7. The comparator 39 is constructed to compare the price accompanying orders to buy with a price incrementally lower than the market price, and to compare the price accompanying orders to sell with a price incrementally higher than the market price. The comparator 39 includes a market price index register 300, a buy-sell price index register 302, a margin register 304, four 15-bit binary full adder circuits 306, 308, 310 and 312, two AND gates 314 and 316, and a NOT gate 318. The binary full adder circuits 306—312 can be similar to those described on pages 83—98 of the book by Richards, cited above. The two AND gates 314 and 316 can be identical with the AND circuit illustrated in FIG. 2–2 (b) on page 32 of the book by Richards. The NOT circuit can be a simple one transistor inventor circuit, similar to the inventor circuit shown in FIG. 11—10 of the book *Computer Handbook* by Huskey and Korn, published in 1962 by McGraw-Hill Book Company, Inc. The index registers can contain 15 symmetrical transistor flip-flops similar to the flip-flop illustrated in FIG. 2A on page 161 of *Electronics*, Volume 29, Number 5, published in May of 1956 by McGraw-Hill Publishing Co., Inc. Each such flip-flop includes a normal output terminal, an inverted or 1's complement output terminal, and a set input terminal.

In the following description, it is assumed that a positive potential indicates a "1," and that a ground potential indicates a "0." The 15-bit binary full adder circuits 306, 308, 310 and 312 are designated, respectively, the first, second, third, and fourth adders. When a single terminal of a multiterminal input or output is referred to, the bit number of the particular terminal is specified first; then the name and the reference number of the input or output is specified; and finally the name and the reference number of the device is specified. For example, the second terminal of the normal output 322 of the market price index register 300 is referred to as terminal 2, normal output 322, market price index register 300. When an input or output terminal of a two or three terminal device is referred to, the name and the reference number of the terminal is specified first; and then the name and the reference number of the device is specified. For example, the input terminal 374 to the second AND gate 316 is referred to as input 374, second AND gate 316. Definite and indefinite articles are frequently omitted from such compound references.

The two index registers 300 and 302 function as comparator shift registers. The market price index register 300 contains 15 flip-flops, and includes both a normal set of output terminals from the 15 flip-flops, normal output 322, and also an inverted or one's complement set of output terminals from the 15 flip-flops, one's complement output 324. A set first bit terminal 378 connects to the set terminal of the first flip-flop within the register 300, and a set second bit terminal 380 is connected to the set terminal of the second flip-flop within the register 300. When terminal 378 and 380 are at ground potential, they do not affect the register 300. If a positive potential is applied to the set first bit terminal 378, the first flip-flop will set, and a "1" will appear at terminal 1, normal output 322, market price index register 300. Similarly, if a positive potential is applied to the set second bit terminal 380, the second flip-flop sets and a "1" appears at terminal 2, normal output 322, market price index register 300.

The buy-sell price index register 302 also contains 15 flip-flops, and includes a set of output terminals 320 from the 15 flip-flops. The index registers 300 and 302 are two of the index registers that come as standard equipment with the system 100, which is assumed to be an International Business Machines 7094 Data Processing System. Both registers are modified as needed to have the external output terminals described above, and the register 300 is further modified if necessary so as to have the set bit terminals 378 and 380, as described above.

Transmission of data to and from the index registers 300 and 302 is performed by gating circuits contained within the central processing unit 102 (FIG. 4). These gating circuits also are standard equipment with the system 100. With the assistance of these gating circuits, 15 bit numbers can be shifted into and out of both the market price index register 300 and the buy-sell price index register 302 under program control.

The margin register 304 has a thirteen terminal output 326 that represents a binary number called the margin number. As explained above, small price fluctuations can be stabilized by adding to or by subtracting from the market price a small margin number before performing the market comparison test. Each of the 13 terminals comprising the output 326 is connected either to a positive potential point or to a ground potential point within the margin register 304.

As described above, the result of the market comparison tests, and also the most recent closing price or market price for each stock, are stored together in a single storage location within the closing price storage area 252 (FIG. 8A). The result of the market comparison tests is stored in bit locations 21 and 22 within this storage location, and the market price number is stored in bit locations 23—35. When the order period begins, bits 21 and 22 within this storage location for a given stock both contain "0"'s, as described above.

Each time a priced order for the even stock is received, the bits 21—35 of the first 36-bit order word 220 (FIG. 6) are placed in the buy-sell index register 302 (FIG. 7). The bit 21 of this word is placed in the first flip-flop and appears at terminal 1, output 320, buy-sell index register 302; bit 22 of the word is placed in the second flip-flop and appears at terminal 2, output 220, buy-sell index register 302; and so on. The bits 21—35 of the word containing the most recent closing price for the given stock and also containing the results of prior market comparison tests for the given stock are retrieved from the closing price storage area 252 (FIG. 8A) and are placed into the market price index register 300. The bit 21 of this word is placed in the first flip-flop and appears at terminal 1, normal output 322, market price index register 300; bit 22 of the word is placed in the second flip-flop and appears at terminal 2, normal output 322, market price index register 300; and so forth. The 1's complement of bit 21 appears at terminal 1, one's complement output 324, market price index register 300; the 1's complement of bit 22 appears at terminal 2, one's complement output 324, market index register 300; and so forth.

As soon as the above information is placed into the registers 300 and 302, the market comparison test is automatically performed. If the order is a priced order to sell, and if the selling price is greater than or equal to the market price minus the margin number, then a positive potential is applied to the set first bit terminal 378, and a "1" is placed into the first flip-flop within the market price index register 300. This "1" appears at terminal 1, normal output 322, market price index register 300. If the order is a priced order to buy, and if the market price plus the margin number is greater than or equal to the selling price, then a positive potential is applied to the set second bit terminal 380, and a "1" is placed into the second flip-flop within the market price index register 300. This "1" appears at terminal 2, normal output 322, market price index register 300. The number occupying the market price index register 300 is now gated back into bit locations 32—35 of the storage location within the closing price storage area 252 (FIG. 8A) where the most recent closing price and the result of prior market comparison tests for the given stock are stored. This completes the market comparison test procedure.

When the order period comes to an end, the bit locations 21 of the storage location containing the market comparison tests result contains a "1" if and only if at least one order to sell stock at a price that is equal to or greater than the market price minus the margin number has been received. The bit location 22 of the same storage location contains a "1" if and only if at least one order to buy stock at a price that is less than or equal to the market price plus the margin has been received. When the trading period beings, the contents of these two bit locations can be used as explained above to determine whether or not the "at market" orders are to be placed into lot storage areas along with the priced orders, or whether they are to be stored separately.

The following paragraphs describe the electrical interconnections between the various elements of the market comparator 39, FIG. 7;

Terminals 3—15, first input 328, first adder 306; and terminals 3—15, first input 338, second adder 308 are respectively connected to terminals 3—15, output 326, margin register 304.

Terminals 3—15, second input 330, first adder 306 are respectively connected to terminals 3—15, normal output 322, market price index register 300. Terminals 3—15, second input 340, second adder 308 are respectively connected to terminals 3—15, one's complement output 324, market price index register 300.

Terminals 1—15, output 342, second adder 308, are respectively connected to terminals 1—15, first input 382, fourth adder 312. Terminals 1—15, output 332, first adder 306, are respectively connected to terminals 1—15, first input 348, third adder 310.

Terminals 3—15, second input 384, fourth adder 312; and terminals 3—15 second input 350, third adder 310 are respectively connected to terminals 3—15, output 320, buy-sell price index register 302.

Carry output terminal 354, third adder 310 is connected to input 374, second AND gate 316. Carry output terminal 398, fourth adder 312 is connected to input 372, first AND gate 314.

Terminal 2, output 320, buy-sell price index register 302 is connected to input 368, NOT gate 318; and also to input 376, second AND gate 316. Output 369, NOT gate 318 is connected to input 370, first AND gate 314.

Output 377, first AND gate 314 is connected to set first bit input 378, market price index register 300. Output 379, second AND gate 316 is connected to set second bit input 380, market price index register 300.

Ground potential connections: Terminals 1—2, first input 328, first adder 306; and terminals 1—2, first input 338, second adder 308 are connected to a ground potential point 366. Carry input terminal 334, first adder 306; and terminals 1—2, second input 330, first adder 306 are connected to a ground potential point 362. Carry input terminal 388, fourth adder 312; and terminals 1—2 second input 384, fourth adder 312 are connected to a ground potential point 360.

Positive potential connections: Carry input terminal 344, second adder 308; and terminals 1—2, second input 340, second adder 308 are connected to a positive potential point 364. Carry input terminal 356, third adder 310; and terminals 1—2, second input 350, third adder 310 are connected to a positive potential point 358.

If the contents of bit locations 21—35 of the first 36-bit order word in an order to trade a given stock are placed into the buy-sell price index register 302, as explained above, and if the contents of bit locations 21—35 of the storage location containing the most recent closing price or market price for the given stock are placed into the market price index register 300, a binary number equal in value to the market price appears at terminals 3—15, normal output 322, market price index register 300. The binary number is applied to terminals 3—15, second input 330, first adder 306. The margin number is already present at terminals 3—15, first input 328, first adder 306. The first adder 306 therefore generates a binary number equal to the sum of these two numbers, and applied this sum to terminals 1—15, output 332, first adder 306. The number appearing at the output 332 and applied to terminals 1—15, first input 348, third adder 310 is the sum of the market price for the given stock plus the margin number.

A binary number equal in value to the 1's complement of the market price of the given stock appears at terminals 3—15, one's complement output 324, of the market price index register 300. This binary number is applied to terminals 3—15, second input 340, second adder 308. Terminals 1—2, second input 340, second adder 308 are already positive, and fill out the remaining two bits of the 1's complement number applied to the second input 340. Carry input 344, second adder 308 is positive, and this adds "1" to the sum appearing at output 342, second adder 308. The margin number is already present at terminals 3—15, first input 338, second adder 308. The second adder 308 therefore generates a binary number equal to the sum of the two input numbers, plus "1" due to the positive potential at the carry input terminal 344. In accordance with the principles of complement arithmetic, this sum is equal numerically to the 2's complement of the market price minus the margin number. The number appearing at the output 342 and applies to terminals 1—15, first input 382, fourth adder 312, is this sum.

If the order being tested is a priced order to sell, the price accompanying the order, which occupies bit locations 23—35 of the first 36-bit order word (see the word 220 in FIG. 6), is present in the form of a binary number appearing at terminals 3—15, output 320, buy-sell price index register 302. This binary number is applied to terminals 3—15, second input 384, fourth adder 312. As explained above, a binary number equal to the 2's complement of the market price minus the margin number is present at terminals 1—15, first input 382, fourth adder 312. The fourth adder 312 therefore generates a binary number equal the sum of the two input numbers. In accordance with the principles of complement arithmetic, this sum is equal to the price accompanying the order, minus the market price, plus the margin number, plus $2^{15}$. If the price accompanying the order is less than the market price minus the margin number, then this sum is less than $2^{15}$ and there is no carry output. The carry output terminal 398 is a ground potential. If the price accompanying the order is equal to or greater than the market price minus the margin number, then this sum is equal to or greater than $2^{15}$ and an overflow carry output occurs. The carry output terminal 398 is a positive potential. The potential appearing at the carry output terminal 398 therefore represents the result of the market comparison test for a priced order to sell.

If the order being tested is a priced order to buy, the 1's complement of the price accompanying the order, which occupies bit locations 23—35 of the first 36-bit order word (see the word 220 in FIG. 6) is present in the form of a 1's complement binary number appearing at terminal 3—15, output 320, buy-sell price index register 302. This 1's complement binary number is applied to terminals 3—15, second input 350, third adder 310. Terminals 1—2, second input 350, third adder 310 are already positive, and fill out the remaining two bits of the 1's complement number applied to the second input 350. Carry input 356, third adder 310 is positive, and this adds "1" to the sum appearing at the output of the third adder 310. As explained above, a binary number equal to the sum of the market price plus the margin number is present at terminals 1—15, first input 348, third adder 310. The third adder 310 therefore generates a binary number equal to the sum of the two input numbers, plus "1" due to the positive potential at the carry input, terminal 356. In accordance with the principles of complement arithmetic, this sum is equal numerically to the market price, plus the margin number, minus the price accompanying the order, plus $2^{15}$. If the price accompanying the order is greater than the market price plus the margin number, then this sum is less than $2^{15}$ and there is no overflow carry output. The carry output terminal 354 is at a positive potential. The potential appearing at the carry output terminal 354 therefore represents the result of the market comparison test for a priced order to buy.

The binary number appearing at terminal 2, output 320, buy-sell price index register 302 determines which of the above-mentioned tests results is stored in the first two flip-flops within the market price index register 300. If the order under test is an order to buy, a "1" appears at terminal 2, output 320, buy-sell index register 302. This "1" appears because all orders to buy contain a "1" in bit location 22 within the first order word, as shown in FIG. 6, and because the contents of this bit location are placed into the second flip-flop within the buy-sell index register 302 (FIG. 7), as explained above. This "1" is applied to input 376, second AND gate 316 (FIG. 7), enabling the second AND gate 316, and effectively connecting the remaining input 374, second AND gate 316 to the output 379, second AND gate 316. When this happens, the potential at the carry output terminal 354, third adder 310 is directly applied to the set second bit terminal 380. This "1" is also converted to a "0" by the NOT gate 318 and is applied to input 370, first AND gate 314. The first AND gate 314 is disabled by this potential, and the set first bit terminal 378 remains at ground potential regardless of the potential at carry output terminal 398, fourth adder 312. In this manner, the order to buy test results are conveyed from the carry output terminal 354, third adder 310, to the second flip-flop within the market price index register 300, and a "1" is placed in this location whenever a priced order to buy is tested and found to have a price that is lower than or equal to the market price plus the margin number.

If the order under test is an order to sell, a "0" appears at terminal 2, output 320, buy-sell index register 302. This "0" appears because all orders to sell contain a "0" in bit location 22 within the first order word, as shown in FIG. 6, and because the contents of this bit location are placed into the second flip-flop within the buy-sell index register 302 (FIG. 7), as explained above. This "0" is applied to input 376, second AND gate 316 (FIG. 7), disabling the second AND gate 316, and causing the set second bit terminal 380 to remain at ground potential regardless of the potential at carry output terminal 354, third adder 310. This "0" also converted to a "1" by the NOT gate 318 and is applied to input 370, first AND gate 314, enabling the first AND gate 314 and effectively connecting the remaining input 372, first AND gate 314, to the output 377, first AND gate 314. When this happens, the potential at the carry output terminal 398, fourth adder 312 is directly applied to the set first bit terminal 378. In this manner, the order to sell test results are conveyed from the carry output terminal 398, fourth adder 312 to the first flip-flop within the market price index register 300, and a "1" is placed in this location whenever a priced order to sell is tested and found to have a price that is greater than or equal to the market price minus the margin number.

While preferred embodiments of the invention as applied to price computation in a stock market situation have been shown, it is to be understood that the invention as defined in the appended claims also is applicable to other types of market situations, and that different embodiments of the present invention will usually be required to satisfy the special requirements of such other market situations. It is also to be understood that various modifications and changes may be made in the embodiments shown without departing from the true spirit and scope of the invention as defined in the appended claims.

What I claim as new and is desired to be secured by Letters Patent of the United States is:

1. A computation system for establishing prices for a given kind of fungible goods, in an auction market, comprising:
   a main data store for recording encoded data items representative of individual orders to buy and sell, and including specific price orders and "at market" orders;
   a closing price store, coupled to said main data store, for recording the last selling price for said goods;
   a buy order sequencing device for arranging and recording buy orders in descending order by price;
   a sell order sequencing device for arranging and recording sell orders in ascending order by price;
   control means coupling said main data store to said sequencing devices to transfer said data items from said main data store to said sequencing devices, said control means including means for transferring each of said "at market" orders at a price determined by the last selling price for the goods;
   and a comparator, coupled to said sequencing devices, for comparing the sell orders and buy orders recorded therein to determine the lowest compatible pair of buy and sell orders, by price, and thereby establish a new selling price for the goods.

2. A computation system for establishing exchange prices for a given kind of fungible goods, in an auction market, comprising:
   a main data store for recording encoded data items representative of individual orders to buy and sell, and including specific price orders and "at market" orders;
   a buy order sequencing device for arranging and recording buy orders in descending order by price and within each price level by time so that at each price level the oldest orders are uppermost;
   a sell order sequencing device for arranging and recording sell orders in ascending order by price and within each price level in descending order by time so that at each price level the oldest orders are uppermost;
   a closing price store, coupled to said main data store, for recording the last selling price for said goods;
   control means coupling said main data store to said sequencing devices to transfer said data items from said main data store to said sequencing devices, said control means including means for transferring each of said "at market" buy orders at said last selling price plus a minimum price increment and said "at market" sell orders at said last selling price less a minimum price increment;
   and a comparator, coupled to said sequencing devices, for comparing the sell orders and buy orders recorded therein to determine the lowest compatible pair of buy and sell orders, by price, to establish a new selling price for the goods.

3. A special-purpose auction market computer for establishing price for a given kind of fungible goods, in an auction market, comprising:
   a main data store for recording encoded data items representative of individual orders to buy and sell, and including specific price orders and "at market" orders, each recorded data item including data representative of the time of entry of the order;
   a buy order sequencing device for arranging and recording buy orders in descending order by price and within each price level by time so that at each price level the oldest orders are uppermost;
   a sell order sequencing device for arranging and recording sell orders in ascending order by price and within each price level in descending order by time so that at each price level the oldest orders are uppermost;
   a closing price store, having an output connected to said main data store, for recording the last selling price for said goods;
   control means, connecting said main data store to both of said sequencing devices, for transferring said data items from said main data store to said sequencing devices, said control means including means for transferring said "at market" orders at a price determined by the last selling price for the goods as stored in said closing price store;
   a comparator having two inputs, one connected to each of said sequencing devices, for comparing the sell orders and buy order recorded in said sequencing devices to determine the lowest compatible pair of buy and sell orders, by price, and thereby establish a new selling price for the goods;
   said comparator being connected to said closing price store to record said new selling price therein for use in a subsequent price determination;
   and output means, connected to said comparator, for recording all buy and sell orders above said lowest compatible pair to thereby record all sales transactions completable at said new selling price.

4. A special-purpose auction market computer according to claim 3, and further comprising inhibiting means, having inputs connected to said main data store and to said control means, actuating said control means to inhibit transfer of any "at market" orders to said sequencing devices whenever there are no specific price orders, of either kind, substantially corresponding to said last selling price.

5. A computation system for establishing prices for a given kind of fungible goods, in an auction market, comprising:
   a main data store for recording encoded data items representative of individual orders to buy and sell, and including specific price orders and "at market" orders;
   a buy order sequencing device for arranging and recording buy orders in descending order by price;
   a sell order sequencing device for arranging and recording sell orders in ascending order by price;
   a closing price store for recording the last selling price for said goods;
   control means coupling said main data store and said closing price store to said sequencing devices to transfer said data items from said main data store to said sequencing devices, said control means including means for transferring each of said "at market" orders at a price determined by the last selling price for the goods;
   inhibiting means, coupled to said control means, for inhibiting transfer of "at market" orders to said sequencing devices whenever there are few or no specific price orders of either kind, substantially corresponding to said last selling price;
   and a comparator, coupled to said sequencing devices, for comparing the sell orders and buy orders recorded therein to determine the lowest compatible pair of buy and sell orders, by price, and thereby establish a new selling price for the goods.

6. A computation system for establishing prices for a given kind of fungible goods, in an auction market, comprising:
   a main data store for recording encoded data items representative of individual orders to buy and sell and including specific price orders and "at market" orders;
   a buy order sequencing device for arranging and recording buy orders in descending order by price;
   a sell order sequencing device for arranging and recording sell orders in ascending order by price;
   a closing price store for recording the last selling price for said goods;
   control means coupling said main data store and said closing price store to said sequencing devices to transfer said data items from said data store to said sequencing devices, said control means including means for transferring each of said "at market" orders at a price determined by said last selling price;
   a market comparator, coupled to said main data store and to said closing price store, for comparing specific price buy and sell orders with said last selling price;
   means, included in said control means, for inhibiting transfer of "at market" orders to said sequencing devices whenever said last selling price is substantially smaller than the prices of all or most specific price buy orders and whenever said last selling price substantially exceeds the prices of all or most specific price sell orders;

and a price comparator, coupled to said sequencing devices, for comparing the sell orders and buy orders recorded therein to determine the lowest buy order, by price, that is equal to or greater than a recorded sell order.

7. A computation system for establishing prices for a given kind of fungible goods, in an auction market, comprising:

a main data store for recording encoded data items representative of individual orders to buy and sell and including specific price orders and "at market" orders;

a buy order sequencing device for arranging and recording buy orders in descending order by price and within each price level by time so that at each price level the oldest orders are uppermost;

a sell order sequencing device for arranging and recording sell orders in ascending order by price and within each price level in descending order by time so that at each price level the oldest orders are uppermost;

a closing price store, coupled to said main store, for recording the last selling price for said goods;

control means coupling said main data store to said sequencing devices to transfer said data items from said data store to said sequencing devices, said control means including means for transferring each of said "at market" buy and sell orders at prices incrementally larger and smaller, respectively, then said last selling price;

a market comparator, coupled to said main data store and to said closing price store, for comparing specific price buy and sell orders with said last selling price;

means, included in said control means, for inhibiting transfer of "at market" orders to said sequencing devices whenever said last selling price is smaller than the prices of all or most specific price buy orders by a given price increment and whenever said last selling price exceeds the price of all or most specific price sell orders by a given price increment;

and a price comparator, coupled to said sequencing devices, for comparing the sell orders and buy orders recorded therein to determine the lowest buy order, by price, that is equal to or greater than a recorded sell order.

8. A computation system for establishing prices for a given kind of fungible goods, in an auction market, comprising:

data storing means for storing data representing buy orders for the goods and for storing data representing sell orders for the goods;

order entering means for entering data representative of individual buy and sell orders, including price information, in said data storing means;

comparing means for sequentially examining and comparing the prices of buy and sell orders recorded in said data storing means, by pairs, taking the buy and sell orders in descending and ascending order by price respectively;

and means, controlled by said comparing means, for selecting the price at which the goods are to be sold and for selecting the pairs of said buy and sell orders to be executed.

9. A computation system for establishing prices for a given kind of fungible goods, in an auction market, comprising:

data storing means for storing data representing buy orders for the goods and for storing data representing sell orders for the goods, said buy and sell orders including specific price orders and "at market" orders;

order entering means for entering data representative of individual buy and sell orders, including price information, in said data storing means;

means including a closing price store for recording the last selling price for the goods, for entering "at market" orders at a price value determined by the last selling price for the goods;

comparing means for sequentially examining and comparing the prices of buy and sell orders recorded in said data storing means, by pairs, taking the buy and sell orders in descending and ascending order by price respectively; "at market" orders being accorded a price value determined by the last selling price for the goods;

and means, controlled by said comparing means, for selecting the lowest compatible pair of buy and sell orders, by price, to establish the price at which the goods are to be sold.

10. A computation system for establishing prices for a plurality of different kinds of fungible goods, in an auction market, comprising:

a main data store for recording encoded data items representative of individual orders to buy and sell, and including specific price orders and "at market" orders;

a closing price store for recording the last selling prices for said goods;

a goods type sequencing device for forming groups of order relating to the same type of fungible goods;

a buy order sequencing device for arranging and recording buy orders within each group in descending order by price;

a sell order sequencing device for arranging and recording sell orders within each group in ascending order by price;

control means coupling said main data store to said closing price store and to said sequencing devices to transfer said data items from said main data store to said sequencing devices, said control means including means for transferring each of said "at market" orders at a price determined by the last selling price for the goods;

and a comparator, coupled to said buy and sell sequencing devices, for comparing the sell orders and buy orders within each group to determine the lowest compatible pairs of buy and sell orders, by price, and thereby establish new selling prices for the goods.

11. A computation system as in claim 10 wherein said buy and sell sequencing devices arrange equal priced orders in descending order by time of receipt.

12. A computation system as in claim 10 wherein "at market" buy orders are transferred at said last selling price plus a minimum price increment and "at market" sell orders are transferred at last selling price less a minimum price increment.

13. A computation system as in claim 10 and including:

inhibiting means, coupled to said control means, for inhibiting transfer of "at market" orders within a group to said buy and sell sequencing devices whenever there are few or no specific price orders of either kind within that group, substantially corresponding in price to the last selling price for goods within that group.

14. A computation system as in claim 10 and including:

a market comparator, coupled to said main data store and to said closing price store, for comparing specific price buy and sell orders within a group to the last selling price of the goods within that group; and means, included in said control means, for inhibiting transfer of "at market" orders within a group to said buy and sell sequencing devices whenever the last selling price of goods within the group is substantially smaller than the prices of all or most specific price buy orders within the group and whenever said last selling price of goods within the group substantially exceeds the prices of all or most specific price sell orders within the group.

15. A computation system for establishing prices for a plurality of differing kinds of fungible goods, in an auction market, comprising:

a main data store for recording encoded data items representative of individual orders to buy and sell and including specific price orders and "at market" orders;

a goods type sequencing device for forming groups of orders relating to the same type of fungible goods;

a buy order sequencing device for arranging and recording buy orders in descending order by price and within each price level by time so that at each price level the oldest orders are uppermost;

a sell order sequencing device for arranging and recording sell orders in ascending order by price and within each price level in descending order by time so that at each price level the oldest orders are uppermost;

a closing price store for recording the last selling price for said goods;

control means coupling said main data store to said closing price store and to said sequencing devices to transfer said data items from said data store to said sequencing devices, said control means including means for transferring each of said "at market" buy and sell orders at prices incrementally larger and smaller, respectively, than said last selling price;

a market comparator, coupled to said main data store and to said closing price store, for comparing specific price buy and sell orders within a group to the last selling price of goods within that group;

means included in said control means, for inhibiting transfer of "at market" orders within a group to said sequencing devices whenever the last selling price of goods within the group is smaller than the prices of all or most specific price buy orders within the group by a given price increment and whenever said last selling price of goods within the group exceeds the price of all or most specific price sell orders within the group by a given price increment;

and a price comparator, coupled to said buy and sell sequencing devices, for comparing the sell orders and buy orders within each group to determine the lowest buy order, by price, within the group that is equal to or greater than a recorded sell order.

16. A computation system for establishing prices for a plurality of different kinds of fungible goods, in an auction market, comprising:

data storing means for storing data representing buy orders for the goods and for storing data representing sell orders for the goods;

order entering means for entering data representative of individual buy and sell orders, including price information, in said data storing means;

comparing means for sequentially examining and comparing the prices of buy and sell orders relating to the same type of goods and recorded in said data storing means, by pairs, taking the buy and sell orders in descending and ascending order by price respectively;

and means, controlled by said comparing means, for selecting the prices at which each type of goods are to be sold and for selecting the pairs of said buy and sell orders to be executed.

17. A computation system for establishing prices for a plurality of different kinds of fungible goods, in an auction market, comprising:

data storing means for storing data representing buy orders for the goods and for storing data representing sell orders for the goods, said buy and sell orders including specific price orders and "at market" orders;

order entering means for entering data representative of individual buy and sell orders, including price information, in said data storing means;

means, including a closing price store for recording the last selling prices for the goods, for entering "at market" orders at price values determined by the last selling prices for the goods;

comparing means for sequentially examining and comparing the prices of buy and sell orders relating to the same type of goods and recorded in said data storing means, by pairs, taking the buy and sell orders in descending and ascending order respectively by price; "at market" orders being accorded a price value determined by the last selling prices for the goods;

and means, controlled by said comparing means, for selecting the lowest compatible pairs of buy and sell orders, by price, to establish the prices at which the goods are to be sold.

18. A machine implementable method for matching orders in an auction market that includes a data processor and a plurality of data input stations at which machine-readable orders to buy or to sell a plurality of differing types of fungible goods may be placed, said orders being accompanied by a trading price or else being assigned a trading price that is based upon an established market price, said method comprising the steps of:

collecting the orders as they are placed in data storage areas of the data processor;

using one or more storage areas of the data processor: to separate the orders relating to different types of fungible goods into separate groups; within each group, to separate the buy orders from the sell orders; within each group of buy orders or sell orders, to arrange the orders sequentially by price with the buy orders arranged in descending order by price and with the sell orders arranged in ascending order of price; and within an ordered group of buy and sell orders, to arrange identically priced orders in descending order by time so that the oldest orders are uppermost; and sequentially matching all of the buy orders and all of the sell orders within each group that can be compatibly matched, starting by first matching the highest priced buy order to the lowest priced sell order, and by then proceeding sequentially through the remaining buy orders and sell orders at rates that maintain equality at all times between the quantity of goods represented by matched orders to buy and the quantity of goods represented by matched orders to sell; breaking orders into a plurality of parts when necessary to maintain this equality; and checking the compatibility of each match by seeing that the price accompanying each buy order is greater than or equal to the price accompanying each sell order, using comparison means within the data processor.

19. A machine implementable method for establishing market prices and for matching orders in an auction market that includes a data processor and a plurality of data input stations at which machine-readable orders to buy or to sell a plurality of differing types of fungible goods may be placed, said orders being either priced orders or at "at market" orders; said method comprising the steps of:

collecting orders as they are placed in data storage areas of the data processor;

using one or more storage areas of the data processor: to separate the orders relating to different types of fungible goods into separate groups; within each group, to separate the buy orders from the sell orders; within each group of buy orders or sell orders, to arrange the orders sequentially by price with the buy orders arranged in descending order by price and with the sell orders arranged in ascending order by price; and within each group of buy orders and sell orders, to arrange identically priced orders in descending order by time of placement so that the oldest orders are uppermost;

sequentially matching all of the buy orders and all of the sell orders within each group that can be compatibly matched, starting by first matching the highest priced buy order to the lowest priced sell order, and by then proceeding sequentially through the remaining buy orders and sell orders at rates that maintain equality at all times between the quantity of goods represented by matched orders to sell, breaking individual orders into a plurality of parts as necessary to maintain this equality; checking the compatibility of each match by seeing that the price accompanying each buy order is greater than or equal to the price accompanying each sell order, using comparison means within the data processor; and adjusting the market price of the various goods to fall within the limits established by the prices accompanying the last pair of orders within each group that were compatibly matched.

20. A method as in claim 19 and including the additional steps of comparing the prices of the orders within each group to the established market price of the goods before the orders are arranged and matched and withholding the "at market" orders within a group from arranging and from matching and price comparing until after a new market price is established, whenever all or most priced orders to buy within the group carry a price that is substantially above the market price or whenever all or most priced orders to sell within the group carry a price that is substantially below the market price, said "at market" orders being later matched to each other and to any remaining buy and sell orders that are compatible with the new market price.

21. A machine implementable method of establishing upper and lower limits on the price of a given kind of fungible goods in an auction market where there is an established market price stored within a data processor and where both priced and unpriced machine-readable buy and sell orders are to be matched by the data processor, said method comprising the steps of:

pairing orders to buy with orders to sell, starting with the order to buy having the highest price and with the order to sell having the lowest price, and continuing through the orders sequentially by price, taking unpriced orders at a price that is related to the established market price, using data retrieval means of the data processor to seek out and to pair the orders;

sequentially comparing the prices accompanying the orders so paired using comparison means within the data processor, and locating the last pair of orders to be matched in which the order to buy is accompanied by a price that is higher than or equal to the price accompanying the order to sell; and determining the prices accompanying said last pair of orders and storing these prices within the data processor as new upper and lower limits on the established market price for the goods.

22. A method as in claim 21 and further including the step of preventing unpriced orders from being paired whenever the market price is substantially below the prices of all or most priced buy orders or whenever the market price is substantially above the prices of all or most priced sell orders, using data processor comparison means and/or arithmetic means to make this determination.

23. A method as in claim 22 in which the test of whether the market price is substantially below or above the prices of priced buy or sell orders is carried out by the data processor comparison means comparing the market price plus a margin number to the prices of all priced buy orders, and comparing the market price minus a margin number to the prices of all priced sell orders.